US007355722B2

(12) United States Patent
Hill

(10) Patent No.: US 7,355,722 B2
(45) **Date of Patent: *Apr. 8, 2008**

(54) CATOPTRIC AND CATADIOPTRIC IMAGING SYSTEMS WITH ADAPTIVE CATOPTRIC SURFACES

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 225 days.

This patent is subject to a terminal disclaimer.

(21) Appl. No.: 10/938,408

(22) Filed: Sep. 10, 2004

(65) Prior Publication Data

US 2005/0195500 A1 Sep. 8, 2005

Related U.S. Application Data

(60) Provisional application No. 60/501,666, filed on Sep. 10, 2003.

(51) Int. Cl.

*G01B 11/02* (2006.01)
*G02B 27/10* (2006.01)
*G02B 27/14* (2006.01)

(52) U.S. Cl. ........................ 356/511; 359/618; 359/629

(58) Field of Classification Search ................ 356/450, 356/511, 512; 359/618, 629; 250/216

See application file for complete search history.

(56) References Cited

U.S. PATENT DOCUMENTS

| | | | |
|---|---|---|---|
| 3,628,027 | A | 12/1971 | Brauss |
| 3,748,015 | A | 7/1973 | Offner |
| 4,011,011 | A | 3/1977 | Hemstreet et al. |
| 4,226,501 | A | 10/1980 | Shafer |
| 4,272,684 | A | 6/1981 | Seachman |
| 4,685,803 | A | 8/1987 | Sommargren |
| 4,733,967 | A | 3/1988 | Sommargren |
| 5,220,403 | A | 6/1993 | Batchelder et al. |
| 5,241,423 | A | 8/1993 | Chiu et al. |
| 5,327,223 | A | 7/1994 | Korth |
| 5,485,317 | A | 1/1996 | Perissinotto et al. |
| 5,602,643 | A | 2/1997 | Barrett |
| 5,614,763 | A | 3/1997 | Womack |
| 5,633,972 | A | 5/1997 | Walt et al. |
| 5,659,420 | A | 8/1997 | Wakai |
| 5,699,201 | A | 12/1997 | Lee |
| 5,757,493 | A | 5/1998 | Vankerkhove |
| 5,760,901 | A | 6/1998 | Hill |
| 5,828,455 | A | 10/1998 | Smith |

(Continued)

OTHER PUBLICATIONS

U.S. Appl. No. 09/852,369, filed Jan. 3, 2002, Hill.

(Continued)

*Primary Examiner*—Patrick Connolly
(74) *Attorney, Agent, or Firm*—Wilmer Cutler Pickering Hale & Dorr LLP

(57) ABSTRACT

An imaging system for imaging an object point to an image point, the system including: a beam splitter positioned to receive light rays from the object point and separate each of a plurality of rays into a transmitted portion and a reflected portion, the transmitted portions defining a first set of rays and the reflected portions defining a second set of rays; and an array of independently positionable reflecting elements forming a reflecting surface positioned to receive one of the sets of rays from the beam splitter and focus that set of rays towards the image point via the beam splitter.

70 Claims, 13 Drawing Sheets

U.S. PATENT DOCUMENTS 5,894,195 A 4/1999 McDermott
5,915,048 A 6/1999 Hill et al.
6,011,654 A 1/2000 Schweizer et al.
6,052,231 A 4/2000 Rosenbluth
6,091,496 A 7/2000 Hill
6,124,931 A 9/2000 Hill
6,271,923 B1 8/2001 Hill
6,330,065 B1 12/2001 Hill
6,445,453 B1 9/2002 Hill
6,480,285 B1 11/2002 Hill
6,552,805 B2 4/2003 Hill
6,552,852 B2 * 4/2003 Hill ............................ 359/618
6,597,721 B1 7/2003 Hutchinson et al.
6,606,159 B1 8/2003 Hill
6,667,809 B2 12/2003 Hill
6,714,349 B2 3/2004 Nam
6,717,736 B1 * 4/2004 Hill ............................ 359/629
6,753,968 B2 6/2004 Hill
6,775,009 B2 8/2004 Hill
6,847,029 B2 1/2005 Hill
6,847,452 B2 1/2005 Hill
7,084,983 B2 * 8/2006 Hill ............................ 356/450
7,095,508 B2 * 8/2006 Hill ............................ 356/512
2002/0074493 A1 6/2002 Hill
2002/0131179 A1 * 9/2002 Hill ............................ 359/629
2003/0174992 A1 9/2003 Levene
2004/0201852 A1 * 10/2004 Hill ............................ 356/511
2004/0201853 A1 * 10/2004 Hill ............................ 356/511
2004/0201854 A1 * 10/2004 Hill ............................ 356/511
2004/0201855 A1 * 10/2004 Hill ............................ 356/511
2004/0202426 A1 10/2004 Hill
2004/0227950 A1 11/2004 Hill
2004/0227951 A1 11/2004 Hill
2004/0228008 A1 * 11/2004 Hill ............................ 359/727
2004/0246486 A1 * 12/2004 Hill ............................ 356/450
2004/0257577 A1 12/2004 Hill
2005/0036149 A1 2/2005 Hill
2005/0111007 A1 * 5/2005 Hill et al. ................... 356/511
2005/0195500 A1 * 9/2005 Hill ............................ 359/726
2006/0033924 A1 * 2/2006 Hill ............................ 356/450
2006/0072204 A1 * 4/2006 Hill ............................ 359/629
2006/0092429 A1 * 5/2006 Hill ............................ 356/512

OTHER PUBLICATIONS

U.S. Appl. No. 09/917,402, filed Jul. 27, 2001, Hill.
U.S. Appl. No. 10/765,254, filed Jan. 27, 2004, Hill.
U.S. Appl. No. 10/765,368, filed Jan. 27, 2004, Hill.
U.S. Appl. No. 10/886,157, filed Jul. 7, 2004, Hill.
U.S. Appl. No. 60/442,858, filed Jul. 27, 2002, Hill.
U.S. Appl. No. 60/442,982, filed Jan. 29, 2003, Hill.
U.S. Appl. No. 60/443,980, filed Jan. 31, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/448,250, filed Jan. 19, 2003, Hill.
U.S. Appl. No. 60/448,360, filed Feb. 19, 2003, Hill.
U.S. Appl. No. 60/459,425, filed Apr. 11, 2003, Hill.
U.S. Appl. No. 60/459,493, filed Apr. 1, 2003, Hill.
U.S. Appl. No. 60/460,129, filed Apr. 3, 2003, Hill.
U.S. Appl. No. 60/485,255, filed Jul. 7, 2003, Hill.
U.S. Appl. No. 60/485,507, filed Jul. 7, 2003, Hill.
U.S. Appl. No. 60/501,666, filed Sep. 10, 2003, Hill.
U.S. Appl. No. 60/506,715, filed Sep. 26, 2003, Hill.

* cited by examiner

CATOPTRIC AND CATADIOPTRIC IMAGING SYSTEMS WITH ADAPTIVE CATOPTRIC SURFACES

This application claims the benefit of U.S. Provisional Application No. 60/501,666, filed Sep. 10, 2003.

BACKGROUND OF THE INVENTION

A number of different applications of catadioptric imaging systems for far-field and near-field interferometric confocal and non-confocal microscopy have been described such as in commonly owned U.S. Pat. No. 6,552,852 (ZI-38) entitled "Catoptric And Catadioptric Imaging Systems" and U.S. Pat. No. 6,717,736 (ZI-43) entitled "Catoptric And Catadioptric Imaging Systems;" U.S. Provisional Patent Applications No.: 60/447,254, filed Feb. 13, 2003, entitled "Transverse Differential Interferometric Confocal Microscopy," (ZI-40); No. 60/448,360, filed Feb. 19, 2003, entitled "Longitudinal Differential Interferometric Confocal Microscopy for Surface Profiling," (ZI-41); No. 60/448,250, filed Feb. 19, 2003, entitled "Method and Apparatus for Dark Field Interferometric Confocal Microscopy," (ZI-42); No. 60/442,982, filed Jan. 28, 2003, entitled "Interferometric Confocal Microscopy Incorporating Pinhole Array Beam-Splitter," (ZI-45); No. 60/459,425, filed Apr. 1, 2003, entitled "Apparatus and Method for Joint Measurement Of Fields Of Scattered/Reflected Orthogonally Polarized Beams By An Object In Interferometry," (ZI-50); and No. 60/485,255, filed Jul. 7, 2003, entitled "Apparatus and Method for Ellipsometric Measurements with High Spatial Resolution;" (ZI-53); and U.S. patent application Ser. No.: 10/778,371, filed Feb. 13, 2004, entitled "Transverse Differential Interferometric Confocal Microscopy," (ZI-40); Ser. No. 10/782,057, filed Feb. 19, 2004, entitled "Longitudinal Differential Interferometric Confocal Microscopy for Surface Profiling," (ZI-41); Ser. No. 10/782,058, filed Feb. 19, 2004, entitled "Method and Apparatus for Dark Field Interferometric Confocal Microscopy," (ZI-42); Ser. No. 10/765,229, filed Jan. 27, 2004, entitled "Interferometric Confocal Microscopy Incorporating Pinhole Array Beam-Splitter," (ZI-45); Ser. No. 10/816,180, filed Apr. 1, 2004, entitled "Apparatus and Method for Joint Measurement Of Fields Of Scattered/Reflected or Transmitted Orthogonally Polarized Beams By An Object In Interferometry," (ZI-50); and Ser. No. 10/886,157, filed Jul. 7, 2004, entitled "Apparatus and Method for Ellipsometric Measurements with High Spatial Resolution," (ZI-53). In addition, U.S. patent application (ZI-48) Ser. No. 10/218,201, entitled "Method for Constructing a Catadioptric Lens System," filed Apr. 1, 2004 described one way to make some of these catadioptric lens systems. These patents, patent applications, and provisional patent applications are all by Henry A. Hill and the contents of each are incorporated herein in their entirety by reference.

In each of the applications of catadioptric imaging systems for each of the cited U.S. patents, U.S. patent applications, and U.S. Patent Provisional Patent Applications, tight tolerances are placed on the manufacture of optical elements. In addition to the tolerances normally encountered in designing a diffraction limited imaging system, there are tolerances imposed in interferometric confocal and non-confocal microscopy applications. The additional tolerances are for example on radii of curvature of certain imaging elements with respect to radii of curvature of certain other imaging elements and on relative locations of centers of curvature of imaging elements.

Adhering to tight tolerances can lead to improved performance of a catoptric or a catadioptric imaging system, e.g., with respect to increasing the average intensity of desired images by a factor of approximately 2 and reducing the intensity of spurious beams by one or more order of magnitudes, and in addition make it possible to realize interferometric reduction of background fields. The interferometric reduction of background fields leads to a reduction of statistical errors. The increase in intensity of desired images and the reduction of statistical errors lead to an increase in signal-to-noise ratios and to a concomitant increase in throughput of a metrology tool using the catoptric or catadioptric imaging system. The interferometric reduction of background fields further leads to a reduction of systematic errors. A consequence of the reduction of systematic errors is a reduction of the computational task required to invert arrays of interference signal values to a multi-dimensional image of an object.

SUMMARY OF THE INVENTION

Taught herein is the use of adaptive catoptric surfaces in catoptric and catadioptric imaging systems. The use of adaptive catoptric surfaces in a catoptric or catadioptric imaging system makes it possible to relax tolerances on the surface figures of elements and to relax tolerances on locations of surfaces of the elements in the catoptric or catadioptric imaging system. The factor by which the tolerances may be relaxed on the surface figures is of the order of 5 for certain of the elements. The use of adaptive catoptric surfaces in a catoptric or catadioptric imaging system further makes it possible to introduce a vertical or lateral scan of a substrate being imaged at slew rates higher then possible and/or practical when the vertical or lateral scan must otherwise be introduced either by translations of an entire catoptric or catadioptric imaging system and associated optics and detector systems or translations of a substrate, e.g., a 300 mm wafer, and substrate support system.

Also taught herein is the replacement of a beam combining beam-splitter in an interferometric imaging system with a thin fluorescent layer or interface.

Also taught herein is the use of a multi-dimensional bi-homodyne detection method and a multi-dimensional quad-homodyne detection method based on amplitude modulations or permutations.

Also taught herein is the use of a multi-dimensional bi-homodyne detection method and a multi-dimensional quad-homodyne detection method based on phase modulations or permutations.

The use of multi-element adaptive catoptric surfaces in catoptric and catadioptric imaging systems also makes it possible to compensate for optical aberrations such as introduced when imaging a plane section of a substrate wherein one or more plane refracting surfaces are located for example in the object space of the catoptric or catadioptric imaging system near the plane section of the substrate. The compensation of the optical aberrations corresponds to the conversion of one or more spherical catoptric surfaces to one or more aspherical catoptric surfaces.

The replacement of a beam combining beam-splitter in interferometric imaging system with a beam combining thin fluorescent layer or interface impacts on the performance specifications required of down stream optical elements and/or detector that follow the beam combining function to achieve a certain end use performance. The thin fluorescent layer absorbs light at one wavelength, e.g., the UV or VUV, and emits light at a longer wavelength, e.g., in the visible.

Thus, there is a concomitant reduction in the required performance specifications of the down stream optical elements because the down stream optical elements serve only to transmit the longer wavelength optical beam instead of the shorter wavelength beam that may be absorbed. The shorter wavelength beam that is absorbed is a mixed beam which comprises a measurement beam component and a reference beam component. In the case where a beam-splitter is used for the beam combining function, the measurement beam component and the reference beam component of the combined beam may have different paths in down stream optical elements that introduce the possibility of non-common path phase errors. These non-common path phase errors are not present when a thin fluorescent layer serves the beam combining function. When the shorter wavelength beam has a wavelength in the UV or VUV or shorter, there is a significant change in the required performance of the detector because it has to serve to detect only the longer wavelength optical beam instead of the shorter wavelength mixed beam. The advantages with respect to the reduction on the required performance specifications of the down stream optical elements are valid for measurement and reference beams comprising either visible or UV or shorter wavelengths.

The implementation of the multi-dimensional bi-homodyne detection method and the multi-dimensional quad-homodyne detection method based on either amplitude or phase modulations or permutations makes it possible to extend the advantages of the bi-homodyne detection method and quad-homodyne detection method for measuring conjugated quadratures of fields jointly to homodyne methods for measuring conjugated quadratures of fields when measuring multi-dimensional properties of the fields jointly.

In general, in one aspect, the invention features an imaging system for imaging an object point to an image point. The system includes: a beam splitter positioned to receive light rays from the object point and separate each of a plurality of rays into a transmitted portion and a reflected portion, the transmitted portions defining a first set of rays and the reflected portions defining a second set of rays; and an array of independently positionable reflecting elements forming a reflecting surface positioned to receive one of the sets of rays from the beam splitter and focus that set of rays towards the image point via the beam splitter.

Other embodiments include one or more of the following features. The reflecting surface is positioned to receive the first set of rays and reflect the first set of rays back to the beam splitter, and wherein the beam splitter is positioned to reflect at least a portion of each ray received from the reflecting surface to the image point. The reflecting surface is substantially concentric with the object point. Alternatively, the reflecting surface is positioned to receive the second set of rays and reflect the second set of rays back to the beam splitter, wherein the beam splitter is positioned to transmit at least a portion of each ray received from the reflecting surface to the image point. In that case, the reflecting surface is substantially concentric with the image point.

Still other features found in various embodiments include the following. The imaging system also includes a first optic having a convex surface which is concentric with and adjacent to the reflecting surface, the first optic also having a flat surface opposite its convex surface, and wherein the beam splitter is positioned adjacent the flat surface. The convex surface of the first optic is a spherical surface. The imaging system further includes a plurality of position control elements, each of which is connected to a corresponding one of the reflecting elements in the array. Each of the position control elements of the plurality of position control elements comprises a transducer and each transducer of the plurality of transducers controls a radial position of its corresponding reflecting element or it controls an orientation of the corresponding reflecting element relative to an optical axis for that reflecting element. The imaging system also includes a servo control system which controls the plurality of transducers. Each of the reflecting elements of the array of reflecting elements conforms with a section of a corresponding different annular ring of a set of concentric annular rings.

Still yet other features found in various embodiments include the following. The reflecting surface is positioned to receive the first set of rays from the beam splitter and focus that set of rays towards the image point via the beam splitter, and the imaging system further includes a second array of independently positionable reflecting elements forming a second reflecting surface positioned to receive the second set of rays from the beam splitter and focus that set of rays towards the image point via the beam splitter. The first-mentioned reflecting surface and the second reflecting surface are located on opposite sides of the beam splitter. The imaging system also includes a first optic having a convex surface which is concentric with and adjacent to the first-mentioned reflecting surface, the first optic also having a flat surface opposite its convex surface, and the beam splitter is positioned adjacent the flat surface. The first optic is located between the beam splitter and the image point. The imaging system further includes a second optic having a convex surface which is concentric with and adjacent to the second reflecting surface, the second optic also having a flat surface opposite its convex surface, and the beam splitter is positioned adjacent the flat surface of the second optic. The second optic is located between the beam splitter and the object point. The convex surface of the first optic is a spherical surface. The second reflecting surface is a convex reflecting surface. Each of the reflecting elements of the first-mentioned array of reflecting elements is a section of a corresponding different annular ring of a first set of concentric annular rings. Each of the reflecting elements of the second array of reflecting elements is a section of a corresponding different annular ring of a second set of concentric annular rings. The imaging system also includes a beam combining beam splitter located at the image point and an optical subsystem that directs a reference beam onto the beam-combining, beam-splitter. The beam-combiner comprises a pinhole array or the beam-combiner comprises a thin fluorescent layer (e.g. lumogen). The thin fluorescent layer is sensitive to UV or VUV. The imaging system further includes a detector and an imaging subsystem that images emissions from the fluorescent layer onto the detector. The fluorescent layer is responsive to radiation at a first wavelength and the detector is responsive to light at a second wavelength, wherein the first and second wavelengths are different. More specifically, the fluorescent layer is responsive to radiation in the UV or VUV region and the detector is responsive to light in the visible region. The first and/or second optics are made of a material from the group consisting of $CaF_2$, fused silica, UV grade fused silica, fluorine-doped fused silica ($F—SiO_2$), and commercially available glass.

In general, in another aspect the invention features an interferometric system that includes: an interferometer that directs a measurement beam at an object point to produce a return measurement beam, focuses the return measurement beam to an image point in an image plane, and mixes the return measurement beam with a reference beam at the image point to form a mixed beam; a thin fluorescent layer located at the image plane which is responsive to the mixed beam and produces an optical beam therefrom; a detector that is responsive to the optical beam from the fluorescent layer; and an imaging system that directs the optical beam from the fluorescent layer onto the detector.

Other embodiments include one or more of the following features. The fluorescent layer comprises lumogen, or, more generally, the fluorescent layer is responsive to radiation at a first wavelength (e.g. UV or VUV) and the detector is responsive to light at a second wavelength (e.g. visible light). The imaging system is a low power microscope. The interferometer includes a catadioptric imaging system. Or the interferometer is constructed like the above-mentioned imaging system, including one or more of the features that were described as being associated with various embodiments of that imaging system.

In general, in still yet another aspect, the invention features a method of performing measurements of an object using an interferometer. The method involves: generating a measurement beam including a first beam at a first frequency and a second beam at a second frequency that is different from the first frequency, said first and second beams being coextensive and sharing the same temporal window; focusing the measurement beam towards an object point on a substrate to produce a return measurement beam, said return measurement beam having N portions each of which represents a different angular segment for the return measurement beam, wherein N is an integer greater than 1; for each portion of the N portions of the return measurement beam, splitting that portion into a first part and a second part; for each portion of the N portions of the return measurement beam, introducing a corresponding sequence of relative phase shifts between the first and second parts of that portion of the return measurement beam; for each portion of the N portions of the return measurement beam, recombining the first and second parts after they have been phased shifted relative to each other to generate a corresponding portion of a recombined beam; interfering the recombined beam with a reference beam to produce a interference beam; and by measuring the interference beam jointly measuring two orthogonal components of conjugated quadratures of N different portions of reflected, scattered, or transmitted beams from the object point.

An advantage of at least one embodiment of the present invention is the generation of diffraction limited images of plane sections on a surface or embedded in a substrate.

Another advantage of at least one embodiment of the present invention is that high speed vertical scans can be generated of a substrate with diffraction limited imaging of plane sections embedded in a substrate and/or on a surface of the substrate.

Another advantage of at least one embodiment of the present invention is that high speed lateral scans can be generated of a substrate with diffraction limited imaging of a plane section on a surface or embedded in a substrate.

Another advantage of at least one embodiment of the present invention is that a high speed approach to and acquisition of a substrate surface can be generated.

Another advantage of at least one embodiment of the present invention is that lateral differential interferometric measurements can be generated of a plane section on a surface or embedded in a substrate.

Another advantage of at least one embodiment of the present invention is that differential measurements of spatial Fourier components can be generated of a plane section on a surface or embedded in a substrate.

Another advantage of at least one embodiment of the present invention is that high speed lateral differential interferometric scans can be generated of a surface or an embedded plane section of a substrate.

Another advantage of at least one embodiment of the present invention is that an optical switching mode of operation can be implemented.

Another advantage of at least one embodiment of the present invention is that an optical phase shifting mode of operation can be implemented.

Another advantage of at least one embodiment of the present invention is that high speed multi-dimensional bi-homodyne and multi-dimensional quad-homodyne detection methods can be used in interferometric measurements of plane sections of a substrate based on amplitude modulations or permutations;

Another advantage of at least one embodiment of the present invention is that high speed multi-dimensional bi-homodyne and multi-dimensional quad-homodyne detection methods can be used in interferometric measurements of plane sections of a substrate based on phase modulations or permutations;

Another advantage of at least one embodiment of the present invention is that switching between evanescent-field and far-field interferometric confocal microscopy and non-confocal imaging of a substrate can be implemented.

The details of one or more embodiments of the invention are set forth in the accompanying drawings and the description below. Other features, objects, and advantages of the invention will be apparent from the description and drawings, and from the claims.

DETAILED DESCRIPTION

In various of the embodiments described herein, one or more catoptric surfaces of a catoptric or catadioptric imaging system are adaptive catoptric surfaces wherein each of the one or more adaptive catoptric surfaces is generated by an array of reflecting elements. The positions and orientations of the reflecting elements are controlled by transducers and a servo control system. The use of multi-element adaptive catoptric surfaces makes it possible to relax tolerances on the surface figures and locations of surfaces of elements in the catoptric or catadioptric imaging system, makes it possible to introduce modes of operation that increases the speed at which scans of a substrate may be implemented, makes it possible to introduce modes of operation that increase the signal-to-noise ratios for image information generated with the catoptric or catadioptric imaging system, makes it possible to operate modes wherein multi-dimensional bi- and quad-homodyne detection methods can be used that are based on amplitude and phase modulations or permutations, makes it possible to operate in either a differential or non-differential mode with the option of switching rapidly between either of the differential or the non-differential mode of operation, and makes it possible to rapidly switch between two different modes of operation wherein in one mode conjugated quadratures of scattered fields of fields that have far-field properties are measured and in the second mode conjugated quadratures of scattered fields of evanescent fields are measured.

Figure 1A:
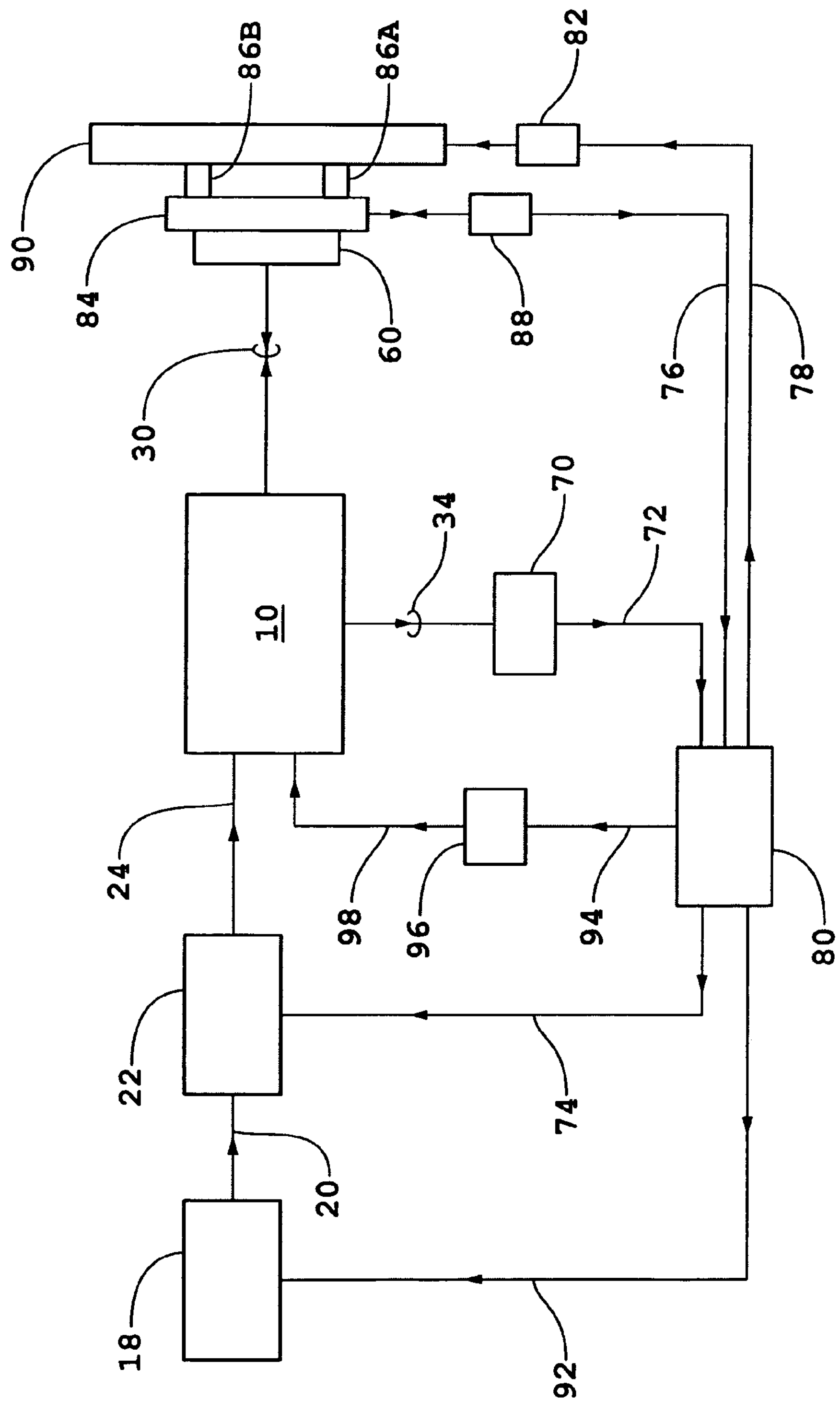
FIG. 1*a* is a schematic diagram of an interferometric system.

A general description of embodiments incorporating various aspects of the present invention will first be given for interferometer systems wherein either multi-dimensional bi-homodyne or multi-dimensional quad-homodyne detection methods are used based on either amplitude or phase modulations or permutations. Referring to FIG. 1*a*, an interferometer system is shown diagrammatically comprising an interferometer 10, a source 18, a beam-conditioner 22, detector 70, an electronic processor and controller 80, and a measurement object shown as substrate 60. Source 18 generates input beam 20. Source 18 is preferably a pulsed source that generates beam 20 with a single frequency component. Beam 20 is incident on and exits beam-conditioner 22 as input beam 24 that has two or four frequency components. Alternatively, source 18 generates beam 20 with two or four frequency components that have different polarization states wherein input beam 24 has two or four frequency components for each of the two different polarization states. The portions of the different frequency components of input beam 24 subsequently used as measurement beams are coextensive in space, other portions of the frequency components of input beam 24 subsequently used as reference beams are coextensive in space, and the portions and the other portions have the same temporal window function.

Interferometer 10 comprises a catadioptric imaging system that has one or more adaptive reflecting surfaces. The shapes of the one or more adaptive reflecting surfaces are controlled by a signal 98 from servo controller 96 according to error signal 94 from electronic processor and controller 80.

The reference and measurement beams are generated either in beam-conditioner 22 or in interferometer 10 for each of the frequency components of input beam 24. The measurement or probe beam incident on substrate 60 is one component of beam 30. Beam 30 further comprises a return reflected/scattered measurement beam that is generated by the reflection/scattering or transmission/scattering of the measurement beam component of beam 30 by substrate 60. The return measurement beam component of beam 30 is combined with the reference beam in interferometer 10 to form a mixed beam. In certain embodiments, the mixed beam is incident on a thin fluorescent layer, e.g. BASF's lumogen®, and output beam 34 is the optical beam generated by fluorescence. In certain other embodiments, output beam 34 comprises a mixed beam.

Output beam 34 is detected by detector 70 to generate an electrical interference signal 72. The composition of the thin fluorescent layer is selected such that the decay time of the fluorescence is much shorter than the read out time of detector 70.

Detector 70 may comprise in the certain other embodiments an analyzer to select common polarization states of the reference and return measurement beam components of beam 34 to form a mixed beam in lieu of beam 34 being formed as a mixed beam.

Substrate 60 is translated by stage 90 wherein substrate 60 is mounted on wafer chuck 84 with wafer chuck 84 mounted on stage 90. The position of stage 90 is controlled by transducer 82 according to servo control signal 78 from electronic processor and controller 80. The position of stage 90 is measured by metrology system 88 and position information acquired by metrology system 88 is transmitted as signal 76 to electronic processor and controller 80 to generate an error signal for use in the position control of stage 90. Metrology system 88 may comprise for example linear displacement and angular displacement interferometers and cap gauges. The elevation and angular orientation of substrate 60 is controlled by transducers 86A and 86B according to servo control signal 78.

In the practice, when bi-homodyne or quad-homodyne detection methods are used, known phase shifts are introduced by either of two different techniques between the reference and measurement beam components of the mixed beam generated by interferometer system 10. In one technique, phase shifts are introduced between the reference and measurement beam components for each of the frequency components by beam-conditioner 22 as controlled by signal 74 from electronic processor and controller 80. In the second technique, phase shifts are introduced between the reference and measurement beam components of the mixed beam for each of the frequency components as a consequence of frequency shifts introduced to the frequency components of input beam 24 by beam-conditioner 22 as controlled by signal 74 from electronic processor and controller 80.

In the practice, when multi-dimensional bi-homodyne or multi-dimensional quad-homodyne detection methods based on amplitude or phase modulations or permutations are used, additional phase shifts are introduced between each corresponding reference and measurement beam portions of N portions of the mixed beam generated by interferometer 10 where N corresponds to the number of dimensions of the multi-dimensional homodyne detection methods. The additional phase shifts are in addition to those introduced in the implementation of bi-homodyne or quad-homodyne detection methods. The additional phase shifts are generated in interferometer 10 by causing changes in the locations of elements of the adaptive catoptric surfaces.

Figure 1B:
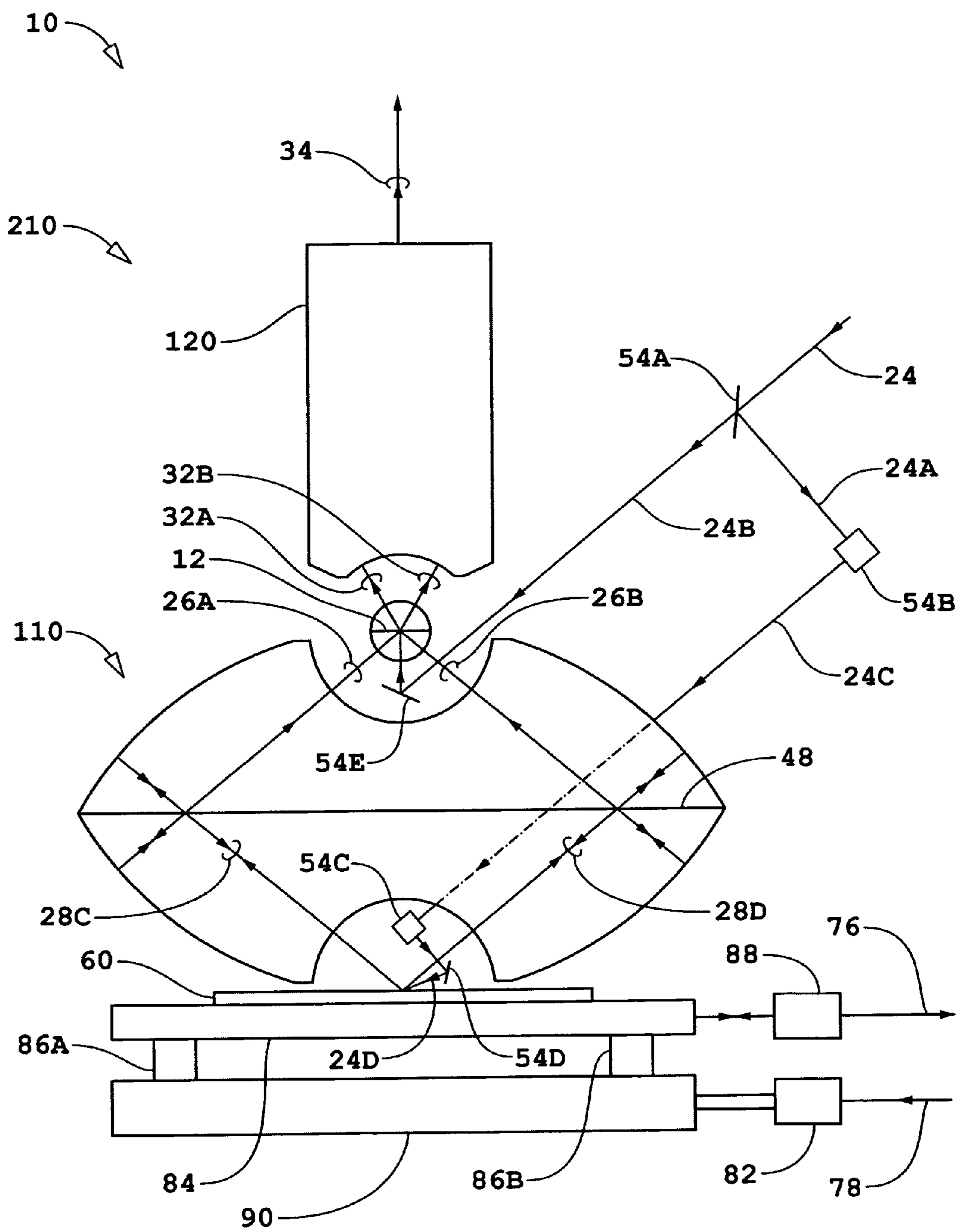
FIG. 1*b* is a schematic diagram of an interferometric non-confocal microscope system that uses a catadioptric imaging system.

An interferometer 10 of the first embodiment is shown schematically in FIG. 1*b*. Interferometer 10 of the first embodiment is a non-confocal interferometric system that comprises a first imaging system generally indicated as numeral 110, thin fluorescent layer 12, and a second imaging system generally indicated as numeral 210. The second imaging system 210 comprises is low power microscope 120 having a large working distance, e.g. Nikon ELWD and SLWD objectives and Olympus LWD, ULWD, and ELWD objectives.

The first imaging system 110 is a catadioptric imaging system such as described in cited U.S. Pat. No. 6,552,852 (ZI-38) and U.S. Pat. No. 6,717,736 (ZI-43); U.S. patent application Ser. No. 10/778,371 (ZI-40), Ser. No. 10/782,057 (ZI-41), Ser. No. 10/782,058 (ZI-42), filed Jan. 28, 2004 (ZI-45), filed Apr. 4, 2004 (ZI-50), and filed Jul. 7, 2004 (ZI-53); and U.S. Provisional Patent Applications No. 60/447,254 (ZI-40), No. 60/448,360 (ZI-41), No. 60/448,250 (ZI-42), No. 60/442,982 (ZI-45), No. 60/459,425 (ZI-50), and No. 60/485,255 (ZI-53). Catadioptric imaging system 110 is shown schematically in FIG. 1*c* with adaptive reflective surfaces 42A-1, 42A-2, 42A-3, 42C-1, 42C-2, 42C-3, 46A-1, 46A-2, 46C-1, and 46C-2. The adaptive reflective surfaces with transducers and servo control signals are shown schematically in FIG. 1*d*. Catadioptric imaging system 110 comprises catadioptric elements 40 and 44, beam-splitter 48, and convex lens 50. Surfaces 42A and 42C comprise a first single convex spherical surface and 46A and 46C comprise a second single convex spherical surface wherein the first and second convex spherical surfaces have the same nominal radii of curvature and the respective centers of curvature of the first and second convex spherical surfaces are conjugate points with respect to beam-splitter 48. Surfaces 42B and 46B are concave spherical surfaces with nominally the same radii of curvature. The centers of curvature of surfaces 42B and 46B are the same as the centers of curvature of the second and first convex spherical surfaces, respectively. The center of curvature of convex lens 50 is the same as the center of curvature of surfaces 42B and the second convex spherical surface.

The radius of curvature of surface 46B is selected so as to minimize the loss in efficiency of the imaging system 110, i.e., to minimize the relative diameter of surface 46B, and to produce a working distance for imaging system 110 acceptable for an end use application.

The radius of curvature of convex lens 50 is selected so that the off-axis aberrations of the catadioptric imaging system 110 are compensated. The medium of elements 40 and 44 may be for example $CaF_2$, fused silica, UV grade fused silica, fluorine-doped fused silica (F—$SiO_2$), or commercially available glass such as SF11. The medium of convex lens 50 may be for example $CaF_2$, fused silica, fluorine-doped fused silica (F—$SiO_2$), YAG, or commercially available glass such as SF11. An important consideration in the selection of the medium of elements 40 and 44 and convex lens 50 will the transmission properties for the frequencies of beam 24.

Convex lens 52 has a center of curvature the same as the center of curvature of convex lens 50. Convex lenses 50 and 52 are bonded together with the thin fluorescent layer 12 in between. The thin fluorescent layer 12 serves as the function of the beam combining beam-splitter in interferometer 10. The second imaging system 210 is designed to image the thin fluorescent layer 12 onto the photosensitive surface of detector 70. The wavelength of beam 32 comprising beams 32A and 32B (see FIG. 1*b*) that is generated by the thin fluorescent layer 12 will in general be in the visible which simplifies the design of the second imaging system 210 and detector 70. The composition of the thin fluorescent layer 12 is selected such that the decay time of the fluorescence of the thin fluorescent layer 12 is significantly less than the read out time of detector 70.

The catoptric surfaces of catadioptric imaging system 110 comprise reflecting surfaces 42A-1, 42A-2, and 42A-3 associated with refractive surface 42A; reflecting surfaces 42C-1, 42C-2, and 42C-3 associated with refractive surface 42C; reflecting surfaces 46A-1 and 46A-2 associated with refractive surface 46A; and reflecting surfaces 46C-1 and 46C-2 associated with refractive surface 46C. The catoptric surfaces of catadioptric imaging system 110 further comprise those portions of surfaces 46A and 46C that do not have an adjacent reflective element and are coated with a reflective coating. The portions of refractive surfaces 42A, 42C, 46A, and 46C that have adjacent reflective elements are not coated with a reflecting coating and thus transmit beams incident thereon.

Reflecting surfaces 42A-1, 42A-2, 42A-3, 42C-1, 42C-2, and 42C-3 comprise nominally a single concave reflecting surface that has a nominal center of curvature the same as the first convex surface. Reflecting surfaces 46A-1 and 46A-2, 46C-1, and 46C-2 comprise nominally a single concave reflecting surface that has a nominal center of curvature the same as the second convex surface. The radial distances between the adaptive reflective surfaces 42A-1, 42A-2, 42A-3, 42C-1, 42C-2, 42C-3, 46A-1, 46A-2, 46C-1, and 46C-2 and associated refractive surfaces of portions of refractive surfaces 42A, 42C, 46A, and 46C are of the order of a few microns. The radial distances could be as large as millimeters with corresponding increases in the radii of curvature of adaptive reflecting surfaces 42A-1, 42A-2, 42C-1, 42C-2, 46A-1, 46A-2, 46C-1, and 46C-2.

Figure 1C:
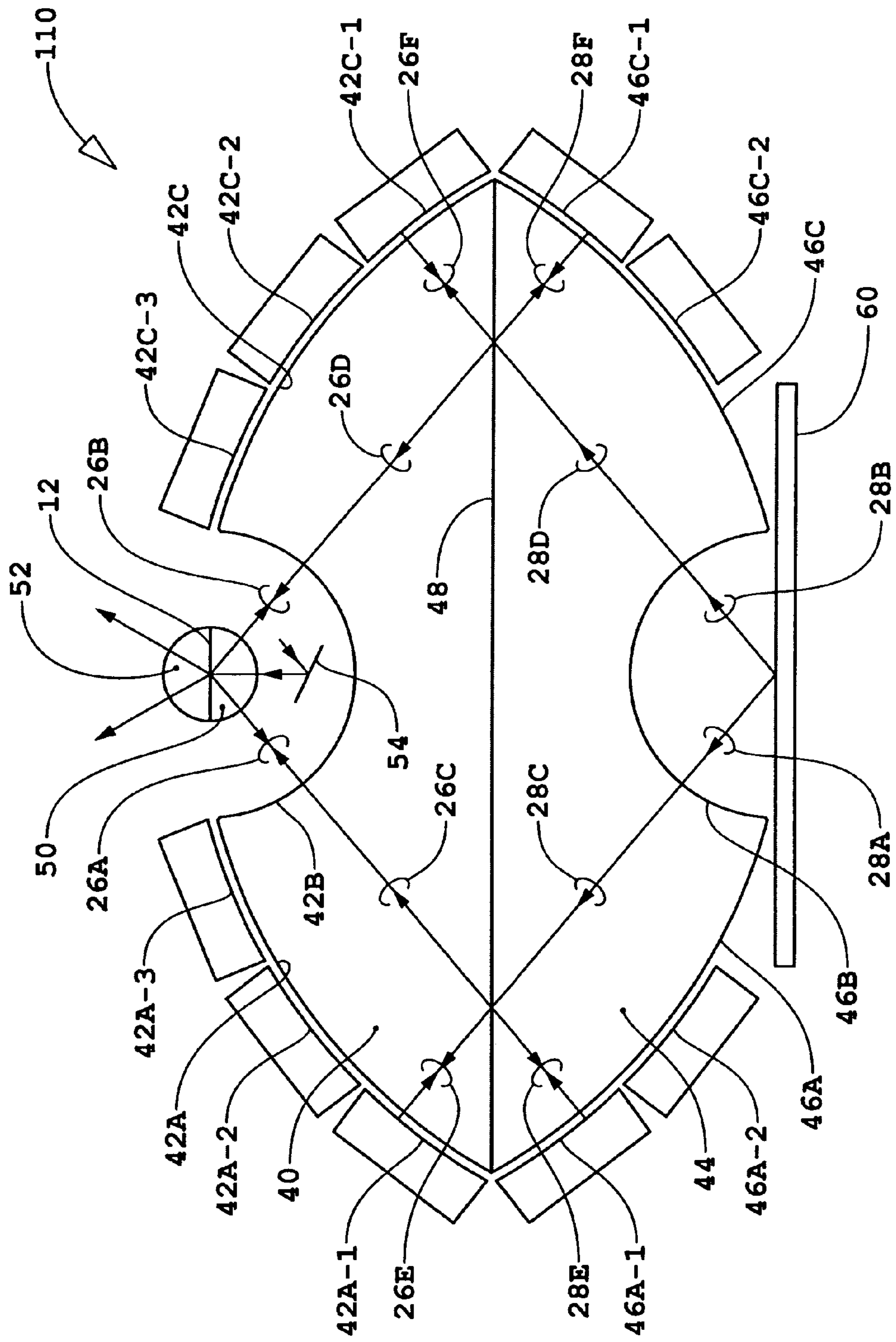
FIG. 1*c* is a diagram of a catadioptric imaging system comprising adaptive catoptric reflecting surfaces.

Adaptive reflecting surfaces 42A-1, 42A-2, 42A-3, 42C-1, 42C-2, and 42C-3 and adaptive reflecting surfaces 46A-1, 46A-2, 46C-1, and 46C-2 shown in FIG. 1*c* may each be representative of annular rings or of sections of annular rings. The remaining description of the first embodiment will be based on the simple configuration wherein there are no additional reflecting surfaces beyond those described without departing from the scope and spirit of the present inventions. The number of corresponding adaptive reflecting surfaces defines of the values of N that may be used in the multi-dimensional bi-homodyne or multi-dimensional quad-homodyne detection methods. In the non-limiting example of the simple configuration, the value for N is 6.

Figure 1D:
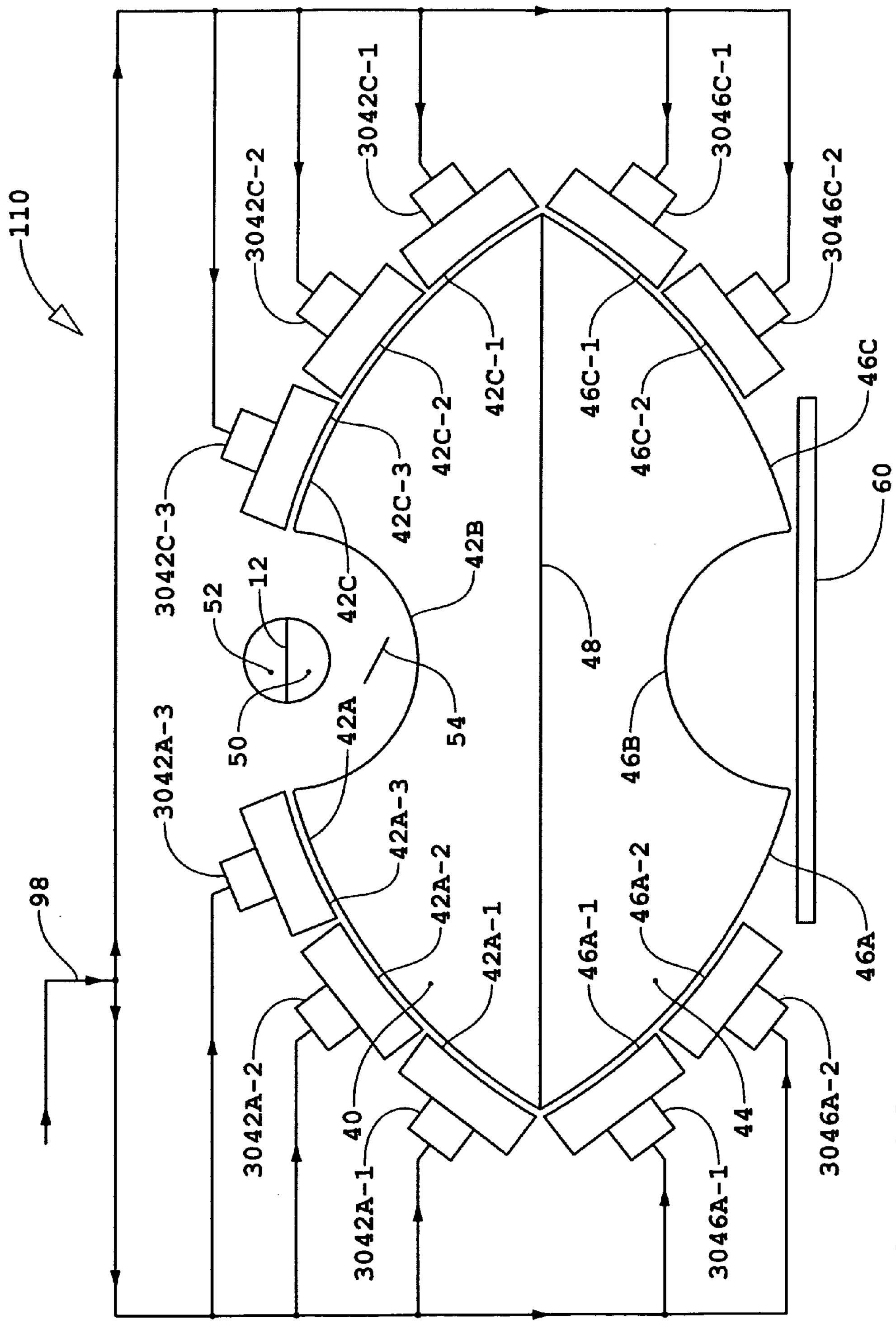
FIG. 1*d* is a diagram of a catadioptric imaging system comprising adaptive catoptric reflecting surfaces attached to displacement transducers.

Referring to FIG. 1*d*, the locations and orientations of adaptive reflecting surfaces are controlled by transducers according to servo control signal 98 from servo controller 96. For each of the adaptive reflective surfaces 42A-1, 42A-2, 42A-3, 42C-1, 42C-2, 42C-3, 46A-1, 46A-2, 46C-1, and 46C-2, there are corresponding transducers 3042A-1, 3042A-2, 3042A-3, 3042C-1, 3042C-2, 3042C-3, 3046A-1, 3046A-2, 3046C-1, and 3046C-2, respectively. Each of the transducers comprise three transducers that can either change the radial position of a corresponding adaptive reflective surface or effect changes in the orientation of the corresponding adaptive reflective surface in two orthogonal planes. The two orthogonal planes intersect in a line that is parallel to the corresponding optical axis of the corresponding adaptive reflective surface.

Referring to FIG. 1*b*, input beam 24 comprising coextensive reference and measurement beam components is incident on element 54A that represents a non-polarizing beam-splitter wherein a first portion thereof is reflected as a measurement beam 24A and a second portion of input beam 24 is incident on non-polarizing beam-splitter 54A is transmitted as reference beam 24B. For those embodiments wherein input beam 24 comprises spatially separated reference and measurement beam components, element 54A represents a mirror that reflects only the spatially separated measurement beam. Measurement beam 24A is incident on optical element 54B and exits as measurement beam 24C. Optical element 54B comprises two mirrors such that beam 24C is displaced out of the plane of FIG. 1*b* and directed toward optical element 54C. Beam 24C exits optical element 54C as measurement beam 24D after reflection by mirror 54D. Optical element 54C comprises two mirrors such that the measurement beam that exits optical element 54D is in the plane of FIG. 1*b* and directed toward mirror 54D. Reference beam 24B is incident on thin fluorescent layer 12 after reflection by mirror 54E.

Measurement beam 24D or probe beam is incident on substrate 60 and a portion thereof is reflected/scattered to form reflected/scattered measurement beams 28A and 28B (see FIG. 1*c*). Measurement beam 24D and reflected/scattered measurement beams 28A and 28B comprise measurement beam 30 shown in FIG. 1*a*. Measurement beam 28A is incident on beam-splitter 48 and first and second portions thereof are transmitted and reflected, respectively, as components of beams 26E and 28E, respectively. The description of the subsequent propagation of the components of beams 26E and 28E will be in terms of N portions wherein the description of each portion of the N portions is substantially the same. The portions of the components of beams 26E and 28E corresponding to one of the portions of the N portions that are subsequently reflected by reflective surfaces 42A-1 and 46A-1, respectively, are portions of components of beams 26E and 28E, respectively, directed toward beam-splitter 48 after two transmissions by refractive surfaces 42A and 46A, respectively. First and second portions of components of beam 26E directed toward beam-splitter 48 are reflected and transmitted, respectively, as components of beam 26C and 28C, respectively. First and second portions of components of beam 28E directed toward beam-splitter 48 are transmitted and reflected, respectively, as components of beam 26C and 28C, respectively. Beam splitter 48 interferometrically combines the transmitted portion of beam 28E and the reflected portion of beam 26E to form beam 26C.

The amplitude A of beam 26C comprising the first portions of beams 26E and 28E reflected and transmitted by beam-splitter 48, respectively, relative to the amplitude of the corresponding portion of beam 28C is given by the equation $$A=T(\theta)^{1/2}R(\theta)^{1/2}(1+\cos\phi) \tag{1}$$

where θ is an angle of incidence at beam-splitter 48 of the first portions of beams 26E and 28E reflected and transmitted by beam-splitter 48, respectively, $T(\theta)^{1/2}$ and $R(\theta)^{1/2}$ are the complex transmission and reflection amplitude coefficients, respectively, and φ is the relative phase shift between the first portions of beams 26E and 28E reflected and transmitted by beam-splitter 48, respectively. A maximum value for the amplitude A is obtained by the adjustment of the relative radial positions of reflective surfaces 42A-1 and 46A-1 to achieve the condition $$\phi=0,\ 2\pi,\ 4\pi, \tag{2}$$

The condition is achieved by control of respective transducers with signal 98 from servo controller 96.

Catadioptric imaging system 110 is functionally equivalent to the imaging properties of an interface wherein the index of refractions on the two sides of the interface are 1 and −1, respectively, when there is constructive interference between the reflected/scattered measurement beam components of beam 26C and 26D. When there is constructive interference between the reflected/scattered measurement beam components, the complex amplitude of the interferometric conjugate image relative to the amplitude that would be achieved by a lossless otherwise equivalent imaging system with respect to pupil function is equal to $$2T(\theta)^{1/2}R(\theta)^{1/2}. \tag{3}$$

The combination of a reflection and a transmission for each ray of the converging beams forming the interferometric conjugate image at center of curvature 60 substantially compensates for departure of properties of beam-splitter 48 from properties of an ideal beam-splitter. The compensation is demonstrated by examination of Equation (3). Function $T(\theta)^{1/2}R(\theta)^{1/2}$ has a maximum at $T(\theta)=R(\theta)=1/2$ and has only a second order dependence on changes of the transmission/reflection properties, i.e., $[T(\theta)^{1/2}-1/\sqrt{2}][R(\theta)^{1/2}-1/\sqrt{2}]$.

The average intensity of transmission of the first embodiment is increased by a factor of 2 as demonstrated by Equation (3) over that which would otherwise be obtained as a result of use of the constructive interference of beams formed by the two different paths through the imaging system of the first embodiment. The constructive interference is achieved in the first embodiment by the adjustment of the relative radial positions of conjugate adaptive reflective surfaces by servo control signal 98. The determination of the correct values for the servo control signal 98 is made during an initialization period of the first embodiment by adjusting for example the relative servo control signal components for corresponding conjugate adaptive reflective surfaces to yield a maximum value in the amplitude of the conjugate image. Other techniques can be used for the determination of the correct values for the components of servo control signal 98 such as introducing phase modulations at a set of non-redundant frequencies and measuring the amplitudes of components of transmitted beams at the non-redundant frequencies.

AR Coating Requirements

In the first embodiment, no AR or anti-reflective coating is required on the portions of refractive surfaces 42A, 42C, 46A, and 46C associated with the adaptive reflective surfaces 42A-1, 42A-2, 42A-3, 42C-1, 42C-2, 42C-3, 46A-1, 46A-2, 46C-1, and 46C-2 to achieve a maximum amplitude for components of beam 26E, 26F, 28E, and 28F.

Adaptive reflective surfaces 42A-1, 42A-2, 42A-3, 42C-1, 42C-2, 42C-3, 46A-1, 46A-2, 46C-1, and 46C-2 and associated portions of refractive surfaces 42A, 42C, 46A, and 46C are separated by radial distances typically of the order of a few microns and form an asymmetric Fabry-Perot cavity. The asymmetric Fabry-Perot cavity comprises a rear mirror that has a high reflectivity and a front mirror as a partially reflecting dielectric interface and is an example of the Gires-Tournois etalon. The beam reflected by a Gires-Tournois etalon is to a high accuracy a purely phase-modulated beam. With a reflectivity of R=0.04 for the front mirror, the relationship between the phase shift introduced by the etalon and the optical path length of the etalon cavity is represent by a linear relationship with a cyclic error that is principally a small amplitude second harmonic cyclic error. The amplitude in phase produced by the second harmonic cyclic error is approximately $2\sqrt{R}=0.4$ radians for R=0.04. In the first embodiment, the effect of the cyclic errors is easily measured in an initialization phase of the first embodiment and subsequently compensated through control of the thickness of the cavities without any modulation of the amplitude or intensity of the reflected beams.

Relaxation of Surface Tolerances

The surface tolerances on portions of refractive surfaces 42A, 42C, 46A, and 46C associated with the adaptive reflective surfaces 42A-1, 42A-2, 42A-3, 42C-1, 42C-2, 42C-3, 46A-1, 46A-2, 46C-1, and 46C-2 are relaxed in the first embodiment as a result of two effects. The first of the two effects is that the net effect of an error in the surface figure of a refractive surface on a double transmission through the refractive surface is reduced relative to the effect of the same error in the surface figure of mirror on an internally reflected beam by a factor of $$\frac{n-1}{n} \quad (4)$$

where n is the index of refraction of the refractive medium and mirror substrate.

The second of the two effects is that the average local errors in the surface figures of the portions of refractive surfaces 42A, 42C, 46A, and 46C associated with the adaptive reflective surfaces 42A-1, 42A-2, 42A-3, 42C-1, 42C-2, 42C-3, 46A-1, 46A-2, 46C-1, and 46C-2 are compensated by adjusting the radial positions of the portions of the adaptive reflective surfaces 42A-1, 42A-2, 42A-3, 42C-1, 42C-2, 42C-3, 46A-1, 46A-2, 46C-1, and 46C-2. In the first embodiment, the effect of the average local errors are easily measured in an initialization phase of the first embodiment and subsequently compensated through the control of the radial positions of the adaptive reflective surfaces 42A-1, 42A-2, 42A-3, 42C-1, 42C-2, 42C-3, 46A-1, 46A-2, 46C-1, and 46C-2.

The second of the two effects can relax the tolerances of the manufacture of the first and second single convex surfaces by a factor of 2 or more.

Manufacture of High Precision Adaptive Reflective Surfaces: Replication

Adaptive reflective surfaces 42A-1, 42A-2, 42A-3, 42C-1, 42C-2, 42C-3, 46A-1, 46A-2, 46C-1, and 46C-2 can be generated by standard optical grinding and polishing techniques. However, improved performance for the catadioptric imaging system 110 is achieved at a lower cost by generating the adaptive reflective surfaces by the process of replication. The master used in the replication process is selected as the best portion of a surface such as the first or second single convex surfaces comprising surfaces 42A and 42C, respectively, and surfaces 46A and 46C, respectively. Thus, adaptive reflective surfaces 42A-1, 42A-2, 42A-3, 42C-1, 42C-2, 42C-3, 46A-1, 46A-2, 46C-1, and 46C-2 are manufactured with surface figures that have a significantly higher precision than the precision of the surfaces of the first and second single convex surfaces.

Use of Conjugate Adaptive Reflective Surfaces as Optical Switches

Each conjugate pair of adaptive reflective surfaces 42A-1, 42A-2, 42A-3, 42C-1, 42C-2, 42C-3, 46A-1, 46A-2, 46C-1, and 46C-2 have been described in terms of maximizing the corresponding portions of amplitudes of beams 26C and 26D [see discussion associated with respect to Equation (1)]. It is apparent on examination of Equation (1) that each of the conjugate pairs of adaptive reflective surfaces may also be used as an optical switch by adjusting the corresponding $\phi$ such that $$\phi=\pi, 3\pi, \quad (5)$$

The condition expressed by Equation (5) is achieved by control of respective transducers with signal 98 from servo controller 96.

The optical switch mode of operation of the conjugate pairs of adaptive reflective surfaces can be beneficially used in initialization phases of the first embodiment. For example, in the initialization phase for the determination of the correct relative phases of conjugate pairs of adaptive reflective surfaces, properties of a pair of conjugate surfaces of the array of conjugate pairs can be individually measured by switching off the complimentary set of array of conjugate pairs.

Note that this procedure automatically compensates for the average local errors in the surface figures of the portions of refractive surfaces 42A, 42C, 46A, and 46C associated with the adaptive reflective surfaces 42A-1, 42A-2, 42A-3, 42C-1, 42C-2, 42C-3, 46A-1, 46A-2, 46C-1, and 46C-2.

The optical switch mode of operation of the conjugate pairs of adaptive reflective surfaces can also beneficially be use to switch from different modes of operation of the first embodiment. The different modes of operation may comprise different values for N in use one form of N-dimensional homodyne detection methods. The one form of N-dimensional homodyne detection method is based on amplitude modulations of portions of an interferometric signal.

Use of Conjugate Adaptive Reflective Surfaces as Phase Shifters

Phases of portions of beam 26C and 26D associated with adaptive reflective surfaces 42A-1, 42A-2, 42A-3, 42C-1, 42C-2, 42C-3, 46A-1, 46A-2, 46C-1, and 46C-2 may be shifted in the first embodiment by adjusting the radial positions of the adaptive reflective surfaces 42A-1, 42A-2, 42A-3, 42C-1, 42C-2, 42C-3, 46A-1, 46A-2, 46C-1, and 46C-2 while maintaining the condition given by Equation (2). In particular, the phases of portions of 26C and 26D associated with adaptive reflective surfaces 42A-1, 42A-2, 42A-3, 42C-1, 42C-2, 42C-3, 46A-1, 46A-2, 46C-1, and 46C-2 may be shifted between the values of $$0 \text{ and } \pi. \quad (6)$$

This phase shifting feature is used in the implementation of the subsequently described N dimensional bi-homodyne and quad-homodyne detection methods based on phase permutations.

Differential Measurements

The phase shift feature of the first embodiment described with respect to Equation (6) can be used to obtain differential measurements of properties of the measurement beams reflected/scattered by substrate 60. The differential measurements are with respect to changes of the amplitudes of the measurement beams reflected/scattered by substrate 60 as a function of reflection/scattering angle.

The Use of Conjugate Adaptive Reflective Surfaces to Compensate for Optical Aberrations When a plane section of substrate 60 that is being imaged by interferometer 10 of the first embodiment is embedded below the surface of substrate 60, spherical aberrations will be introduced such as described in U.S. Provisional Patent Application No. 60/444,707 (ZI-44) entitled "Compensation for Effects of Mismatch in Indices of Refraction at a Substrate-Medium Interface in Confocal and Interferometric Confocal Microscopy" and U.S. patent application Ser. No. 10/771,785 (ZI-44) entitled "Compensation for Effects of Mismatch in Indices of Refraction at a Substrate-Medium Interface in Confocal and Interferometric Confocal Microscopy" for which both are by Henry A. Hill and the contents of both are herein incorporated in their entirety by reference. The spherical aberrations are compensated in catadioptric imaging system 110 by changing the focal lengths of conjugate pairs of adaptive reflective surfaces 42A-1, 42A-2, 42C-1, 42C-2, 46A-1, 46A-2, 46C-1, and 46C-2. The focal lengths of the conjugate pairs of adaptive reflective surfaces are adjusted by changing the radial locations of the conjugate pairs of adaptive reflective surfaces 42A-1, 42A-2, 42C-1, 42C-2, 46A-1, 46A-2, 46C-1, and 46C-2.

The surfaces represented by adaptive reflective surfaces 42A-1, 42A-2, 42A-3, 42C-1, 42C-2, and 42C-3 are changed in compensating for the effects of the spherical aberrations from a nominally spherical surface to a nominal aspherical surface. Also the surfaces represented by adaptive reflective surfaces 46A-1, 46A-2, 46C-1, and 46C-2 are changed in compensating for the effects of the spherical aberrations from a nominally spherical surface to a nominal aspherical surface.

Use of Conjugate Adaptive Reflective Surfaces to Generate Vertical and Lateral Scans A vertical scan of plane sections of substrate 60 is implemented in the first embodiment by scanning the focal lengths of conjugate pairs of adaptive reflective surfaces 42A-1, 42A-2, 42A-3, 42C-1, 42C-2, 42C-3, 46A-1, 46A-2, 46C-1, and 46C-2. The focal lengths of the conjugate pairs of adaptive surfaces are adjusted by scanning the radial locations of the conjugate pairs of adaptive surfaces 42A-1, 42A-2, 42C-1, 42C-2, 46A-1, 46A-2, 46C-1, and 46C-2.

A lateral scan of a plane section of substrate 60 is implemented in the first embodiment by scanning the centers of curvature of adaptive reflective surfaces 42A-1, 42A-2, 42A-3, 42C-1, 42C-2, 42C-3, 46A-1, 46A-2, 46C-1, and 46C-2. The centers of curvatures of the adaptive surfaces are adjusted by scanning the angular orientations of the adaptive reflective surfaces 42A-1, 42A-2, 42C-1, 42C-2, 46A-1, 46A-2, 46C-1, and 46C-2.

The bandwidth of the speeds of the vertical and lateral scans of substrate 60 are determined in the first embodiment by the bandwidth of the scanning speeds in radial positions and angular orientations, respectively, of the adaptive reflective surfaces 42A-1, 42A-2, 42A-3, 42C-1, 42C-2, 42C-3, 46A-1, 46A-2, 46C-1, and 46C-2. The bandwidths of the scanning speeds of the adaptive reflective surfaces will generally be orders of magnitude larger than either the bandwidth of vertical and lateral scans that can be generated by translating the interferometer system 10 and detector system 70 or the bandwidth of vertical and lateral scans that can be generated by physically translating the vertical and lateral position of substrate 60 and wafer chuck 84.

Selection of Radii of Curvature

The description of the considerations made in the selection of radii of curvature of the first single convex surface comprising surfaces 42A and 42C, the second single convex surface comprising surfaces 46A and 46C, concave surfaces 42B and 46B, the adaptive reflective surfaces 42A-1, 42A-2, 42A-3, 42C-1, 42C-2, 42C-3, 46A-1, 46A-2, 46C-1, and 46C-2 are that same as the description given for the selection of radii of corresponding optical surfaces in the third embodiment and in the cited U.S. Provisional Patent Application No. 60/485,255 (ZI-53). The description of the selection of the radius of curvature associated with element 50 is the same as the description of the selection of the corresponding optical surface in the third embodiment and in the cited U.S. Provisional Patent Application No. 60/485,255 except that the radius of curvature associated with element 50 are ½ of the radius of curvature of the corresponding optical surface in the third embodiment and in the cited U.S. Provisional Patent Application No. 60/485,255.

N-Dimensional Bi-Homodyne and Quad-Homodyne Detection Methods

The description of source 18 including a pulse mode of operation and beam-conditioner 22 is the same as the corresponding portions of the description given to the source and beam-conditioner in embodiments described in commonly owned U.S. Provisional Patent Application No. 60/442,858 (ZI-47) entitled "Apparatus and Method for Joint Measurements of Conjugated Quadratures of Fields of Reflected/Scattered Beams by an Object in Interferometry" and U.S. patent application Ser. No. 10/765,368 (ZI-47) of which both are by Henry A. Hill and the contents of both of which are herein incorporated in their entirety by reference, and in cited U.S. Provisional Patent Application No. 60/485,255 (ZI-53) and U.S. patent application filed Jul. 7, 2004 (ZI-53). The beam-conditioner 22 may comprise acousto-optic modulators.

The descriptions the of bi-homodyne and quad-homodyne detection methods of the first embodiment are the same as corresponding portions of the descriptions given for the descriptions of bi-homodyne and quad-homodyne detection methods in cited U.S. Provisional Patent Application Nos. 60/442,858 (ZI-47) and 60/485,255 (ZI-53) and in cited U.S. patent application Ser. No. 10/765,368 (ZI-47) and U.S. patent application filed Jul. 7, 2004 (ZI-53) wherein the homodyne detection methods are based on frequency encoding. The extension of the bi-homodyne and quad-homodyne detection methods to N-dimensional bi-homodyne and quad-homodyne detection methods based on a combination of frequency encoding and either amplitude or phase modulations or permutations is implemented in the first embodiment by the use of the conjugate pairs of adaptive reflective surfaces of catadioptric imaging system 110 as optical switches or as $\pi$ phase shifters, respectively. The extension of the bi-homodyne and quad-homodyne detection methods to N-dimensional bi-homodyne and quad-homodyne detection methods may also be based on a combination of frequency encoding, polarization encoding, and either amplitude or phase modulations or permutations. The description of bi- and quad-homodyne detection methods based on a combination of frequency and polarization encoding is the same as the corresponding description given in cited U.S. Provisional Patent Application No. 60/459,425 (ZI-50) and in cited U.S. patent application filed Apr. 4, 2004 (ZI-50) entitled "Apparatus and Method for Joint Measurement Of Fields Of Orthogonally Polarized Beams Scattered/Reflected By An Object In Interferometry."

The N-dimensional bi- and quad-homodyne detection methods are homodyne detection methods that exhibit the same properties as the cited bi- and quad-homodyne detection methods with respect to making joint measurements of conjugated quadratures of fields: a joint measurement of a conjugated quadratures of fields is made in the bi- and quad-homodyne detection methods and joint measurements are made of N independent conjugated quadratures of fields in the N-dimensional bi- and quad-homodyne detection methods where N is an integer. The (i,k) electrical interference signal $\Sigma_{i,k}$, $1 \leqq i < N$ and $1 \leqq k \leqq 4$, is written in terms of the contribution $S_{i,j,k}$ that corresponds to portion j of the N portions of electrical interference signal $\Sigma_{i,k}$ associated with the conjugate pairs of adaptive reflective surfaces 42A-1, 42A-2, 42A-3, 42C-1, 42C-2, 42C-3, 46A-1, 46A-2, 46C-1, and 46C-2. The representation of $\Sigma_{i,k}$ in terms of $S_{i,j,k}$ is expressed as $$\Sigma_{i,k} = \sum_{j=1}^{N} h_{ij} S_{i,j,k}, \quad 1 \le i \le N, 1 \le k \le 4 \tag{7}$$

where $h_{ij}$ are matrix elements $H=(h_{ij})$ are constants.

The values of matrix elements $h_{ij}$ are selected and controlled by conjugate adaptive reflective surfaces operating in either the phase shifting mode or the optical switching mode. In the phase shifting mode, the values of $h_{ij}$ are selected to be ±1 which corresponds to use of phase modulations or permutations. In the optical switching mode, the matrix elements $h_{ij}$ are selected to be either 0 or 1 which corresponds to amplitude modulations or permutations. In the case of phase modulations, the measurement of each of the N independent conjugated quadratures is made as a joint measurement and the N independent conjugated quadratures may be jointly measured with respect to each other. In the case of amplitude modulations, the measurement of each of the N independent conjugated quadratures is made as a joint measurement although the N independent conjugated quadratures are not jointly measured with respect to each other.

There are 4N values of electrical interference signal $\Sigma_{i,k}$ measured for each spot in or on substrate 60 that is being imaged. The number of different values of the electrical interference signal $\Sigma_{i,k}$ that is measured is 4 times the number of independent conjugated quadratures that are being measured because there are 2N independent components of conjugated quadratures measured and two measurements of electrical interference signal values are required for each independent component of conjugated quadratures. For further discussion, reference is made to the bi-homodyne detection method such as described in cited U.S Provisional Patent Applications No. 60/442,858 (ZI-47) and in cited U.S. patent applications filed Jan. 27, 2004 (ZI-47) entitled "Apparatus and Method for Joint Measurements of Conjugated Quadratures of Fields of Reflected/Scattered and Transmitted Beams by an Object in Interferometry" and in commonly owned U.S. Provisional Patent Application No. 60/485,507 (ZI-52) and in commonly owned U.S. patent application filed Jul. 7, 2004 (ZI-52) and entitled "Apparatus And Method For High Speed Scan For Detection And Measurement of Properties of Sub-Wavelength Defects And Artifacts In Semiconductor And Mask Metrology" wherein conjugated quadratures of scattered/reflected or scattered/transmitted fields are obtained jointly with a set of four electrical interference signal values obtained for each spot on and/or in a substrate being imaged. The latter cited provisional and non-provisional applications are by Henry A. Hill and the contents of each are incorporated herein in their entirety by reference.

The contribution $S_{i,j,k}$ is represented for the bi-homodyne detection method within a scale factor by the formula $$S_{i,j,k} = P_{i,k} \sum_{m=1}^{2} \left\{ \begin{array}{l} \xi_{i,k}^2 |A_{j,m}|^2 + \zeta_{i,k}^2 |B_{j,m}|^2 + \eta_{i,k}^2 |C_{j,m}|^2 + \\ \zeta_{i,k} \eta_{i,k}^2 |B_{j,m}||C_{j,m}| \cos \varphi_{B_{j,m} C_{j,m} \varepsilon_{m,k}} + \\ \xi_{i,k} \zeta_{i,k} 2|A_{j,m}||B_{j,m}| \cos \varphi_{A_{j,m} B_{j,m} \varepsilon_{m,k}} + \\ \varepsilon_{m,k} \xi_{i,k} \eta_{i,k} \, [1 - (-1)^m] |A_{j,m}||C_{j,m}| \cos \varphi_{A_{j,m} C_{j,m}} + \\ \varepsilon_{m,k} \xi_{i,k} \eta_{i,k} \, [1 + (-1)^m] |A_{j,m}||C_{j,m}| \sin \varphi_{A_{j,m} C_{j,m}} \end{array} \right\} \tag{8}$$

where coefficient $A_{j,m}$ represents the amplitude of the reference beam corresponding to pulse (i,k) of input beam 24 and to the frequency component of the input beam 24 that has index m; coefficient $B_{j,m}$ represents the amplitude of the background beam corresponding to reference beam $A_{j,m}$; coefficient $C_{j,m}$ represents the amplitude of the return measurement beam corresponding to reference beam $A_{j,m}$; $P_{i,k}$ represents the integrated intensity of the first frequency component of the input beam 24 pulse (i,k) of a sequence of 4N pulses; and an example set of values for $\epsilon_{m,k}$ are listed in Table 1. There are other set of values for $\epsilon_{m,k}$ that may be used wherein the other set of values for $\epsilon_{m,k}$ satisfy the conditions set out in subsequent Equations (9)and (10) herein.

TABLE 1

| | $\epsilon_{m,k}$ | |
|---|---|---|
| | m | |
| k | 1 | 2 |
| 1 | 1 | 1 |
| 2 | 1 | −1 |
| 3 | −1 | −1 |
| 4 | −1 | 1 |

The change in the values of $\epsilon_{m,k}$ from 1 to −1 or from −1 to 1 corresponds to change in relative phases of respective reference and measurement beams. The coefficients $\xi_{i,k}$, $\zeta_{i,k}$, and $\eta_{i,k}$ represent effects of variations in properties of a conjugate set of 4N pinholes such as size and shape if used in the generation of the spot on and/or in substrate 60, properties of a conjugate set of 4N pinholes such as size and shape if used at a conjugate set of 4N detector pixels corresponding to the spot on and/or in substrate 60, and the sensitivities of the conjugate set of 4N detector pixels for the reference, background, and the return measurement beam, respectively. In a single-frequency single-homodyne detection operating in a non-scanning mode, the conjugate set of pinholes corresponds to a single pinhole and the conjugate set of four pixels corresponds to a single pixel. In a single-frequency single-homodyne detection operating in a non-scanning mode, the conjugate set of four pinholes comprise pinholes of pinhole array beam-splitter 12 that are conjugate to a spot in or on the substrate being imaged at different times during the scan.

An important requirement of $\epsilon_{m,k}$ is that $$\sum_{k=1}^{4} \varepsilon_{m,k} = 0, \quad m = 1, 2. \tag{9}$$

Another important requirement is that the $\epsilon_{m,k}$ are orthogonal over the range of m=1,2 for m≠m' since $\epsilon_{m,k}$ and $\epsilon_{m',k}$ are orthogonal over the range of k=1,2,3,4, i.e., $$\sum_{j=1}^{4} \varepsilon_{m,j}\varepsilon_{m',j} = 4\delta_{m,m'} \tag{10}$$

where $\delta_{m,m'}$ is the Kronecker delta defined by $$\delta_{m,m'}=1 \text{ for } m=m',$$

$$\delta_{m,m'}=0 \text{ for } m\neq m'. \tag{11}$$

A set of conditions that are used to derive the matrix elements $h_{i,j}$ for the phase modulation or permutation embodiment are that the values of $h_{i,j}$ are either ±1 and that $$\sum_{j=1}^{N} h_{i,j}h_{i',j} = N\delta_{i,i'}. \tag{12}$$

Three examples of matrices $H=(h_{ij})$ which meet the requirements of the N-dimensional bi-homodyne and N-dimensional quad-homodyne detection methods when using phase modulations or permutations are as follows:

$$(h_{ij}) = \begin{pmatrix} 1 & 1 \\ 1 & -1 \end{pmatrix}, \quad N = 2; \tag{13}$$

$$(h_{ij}) = \begin{pmatrix} 1 & 1 & 1 & 1 \\ 1 & -1 & 1 & -1 \\ 1 & 1 & -1 & -1 \\ 1 & -1 & -1 & 1 \end{pmatrix}, \quad N = 4; \tag{14}$$

$$(h_{ij}) = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix}, \quad N = 8. \tag{15}$$

Note that the matrix $(h_{ij})$ for $N=2^p$ where p is an integer is generated from the matrix $(h_{ij})$ for $N=2^{p-1}$ and the matrix $(h_{ij})$ for N=2, i.e., for each matrix element of $(h_{ij})$ for N=2, substitute the matrix $(h_{ij})$ for $N=2^{p-1}$ multiplied by the respective matrix element of $(h_{ij})$ for N=2. This construction technique corresponds to the Sylvester construction [see Sylvester (1867)].

The matrix $H=(h_{ij})$ defined in the preceding discussions are Hadamard matrices of order N. Hadamard matrices are a class of square matrix invented by Silvester [J. J. Sylvester, London Edinburgh and Dublin *Philos. Mag. And J. Sci.*, 34, p 461 (1867)] under the name of anallagmatic pavement, 26 years before Hadamard [J. Hadamard, *Math. Phys.* 12, p 311 (1893)] considered them. Hadamard matrices are common in signal processing and coding applications.

An N×N matrix $H=(h_{ij})$ is an Hadamard matrix of order N if the entries of are either ±1 and such that $HH^T=NI$ where $H^T$ is the transpose of H and I is the order N identity matrix. In other words, an N×N matrix with only +1 and −1 as its elements is Hadamard if the inner product of two distinct rows is 0 and the inner product of a row with itself is N, which is equivalent to the condition given by Equation (12).

A Hadamard matrix of order N is a solution to Hadamard's maximum determinant problem, i.e., it has the maximum possible determinant (in absolute value) of any complex matrix with elements $|a_{ij}|\leqq 1$ [J. Brenner and L. Cummings, *Amer. Math. Monthly* 79 p. 626 (1972)], namely $N^{N/2}$.

To obtain a matrix $(h_{ij})$ for N different from a value of $2^p$ by integer q, remove any q columns from the Hadamard matrix $H=(h_{ij})$ specified herein for $N=2^p$. For this case, matrix $(h_{ij})$ is a (N−q)×N rectangular matrix and N−q independent conjugated quadratures are measured jointly from 4N measured values of electrical interference signal $\Sigma_{i,k}$ for each spot in or on substrate 60 being imaged. In various embodiments, arrays of values of electrical interference signal $\Sigma_{i,k}$ are obtained simultaneously with an array of detector pixels to yield an array of N−q independent conjugated quadratures jointly measured for an array of spots in or on a section of substrate 60 being imaged.

The first step in the processing the measured values of $\Sigma_{i,k}$ for the conjugated quadratures specified by j=p, the corresponding $S_{i,p,k}$ term in $\Sigma_{i,k}$ are projected out or extracted from the measured $\Sigma_{i,k}$ to obtain four quantities by using the orthogonal properties of $h_{i,j}$ as expressed by Equation (12). The four quantities are subsequently processed for the conjugated quadratures specified by j=p using the orthogonal properties of $\epsilon_{m,k}$ expressed by Equation (10) such as described in cited U.S. Provisional Patent Applications No. 60/442,858 (ZI-47), and No. 60/485,507 (ZI-52) and in cited U.S. patent applications filed Jan. 27, 2004 (ZI-47) entitled "Apparatus and Method for Joint Measurements of Conjugated Quadratures of Fields of Reflected/Scattered and Transmitted Beams by an Object in Interferometry" and filed Jul. 7, 2004 (ZI-52) and entitled "Apparatus And Method For High Speed Scan For Detection And Measurement of Properties of Sub-Wavelength Defects And Artifacts In Semiconductor And Mask Metrology." The procedure is repeated to obtain the other conjugated quadratures.

The advantages of the N-dimensional bi-homodyne and quad-homodyne detection methods are the same as the advantages of the bi-homodyne and quad-homodyne detection methods described in cited U.S. Provisional Patent Application Nos. 60/442,858 (ZI-47) and 60/485,507 (ZI-52) and in cited U.S. patent application Ser. No. 10/765,368 (ZI-47) and U.S. patent application filed Jul. 7, 2004 and entitled "Apparatus And Method For High Speed Scan For Detection And Measurement of Properties of Sub-Wavelength Defects And Artifacts In Semiconductor And Mask Metrology" (ZI-52).

The option of using the conjugate adaptive reflective surfaces as optical switches makes it possible to rapidly change the effective value of N from a maximum value to values less than the maximum value for either of the amplitude or phase modulation or permutation modes. For example, if the maximum value of N is 8, the system can rapidly change from operating with a value of N=8 to a value of N=2.

The conditions that are used to derive the matrix elements $h_{i,j}$ for the amplitude modulation or permutation embodiment are that the values of $h_{i,j}$ be equal to either 0 or 1 and that the selection of the designs yield the best signal-to-noise ratios. In this is case, the values of the matrix elements $h_{i,j}$ are derived for example from a binary simplex code [see M. Harwit and N. J. A. Sloane, *Hadamard Transform Optics* (Academic, New York, 1979)]. Using $s_{ij}$ to denote the matrix elements $h_{i,j}$ for the amplitude modulation or permutation, an example of a set of matrix elements $s_{ij}$ of order 7 is $$(s_{ij}) = \begin{pmatrix} 0 & 0 & 1 & 0 & 1 & 1 & 1 \\ 0 & 1 & 0 & 1 & 1 & 1 & 0 \\ 1 & 0 & 1 & 1 & 1 & 0 & 0 \\ 0 & 1 & 1 & 1 & 0 & 0 & 1 \\ 1 & 1 & 1 & 0 & 0 & 1 & 0 \\ 1 & 1 & 0 & 0 & 1 & 0 & 1 \\ 1 & 0 & 0 & 1 & 0 & 1 & 1 \end{pmatrix}. \quad (16)$$

The phase shift feature can be used to obtain differential measurements of properties of the measurement beams reflected/scattered by substrate 60. For an example of N=2 and the introduction of a relative phase shift π between the beams corresponding to the pair of conjugate adaptive reflective surfaces, the measured quantities correspond to a differential measurement, i.e., operation in a dark field mode.

An advantage of the first embodiment is that with the generation of the optical interference signal in the intensity of beam 32 comprising beams 32A and 32B, the specifications of the second imaging system 210 are further relaxed as compared when the second imaging system 210 must preserve the phase relationship between reference and measurement beam components.

Figure 1E:
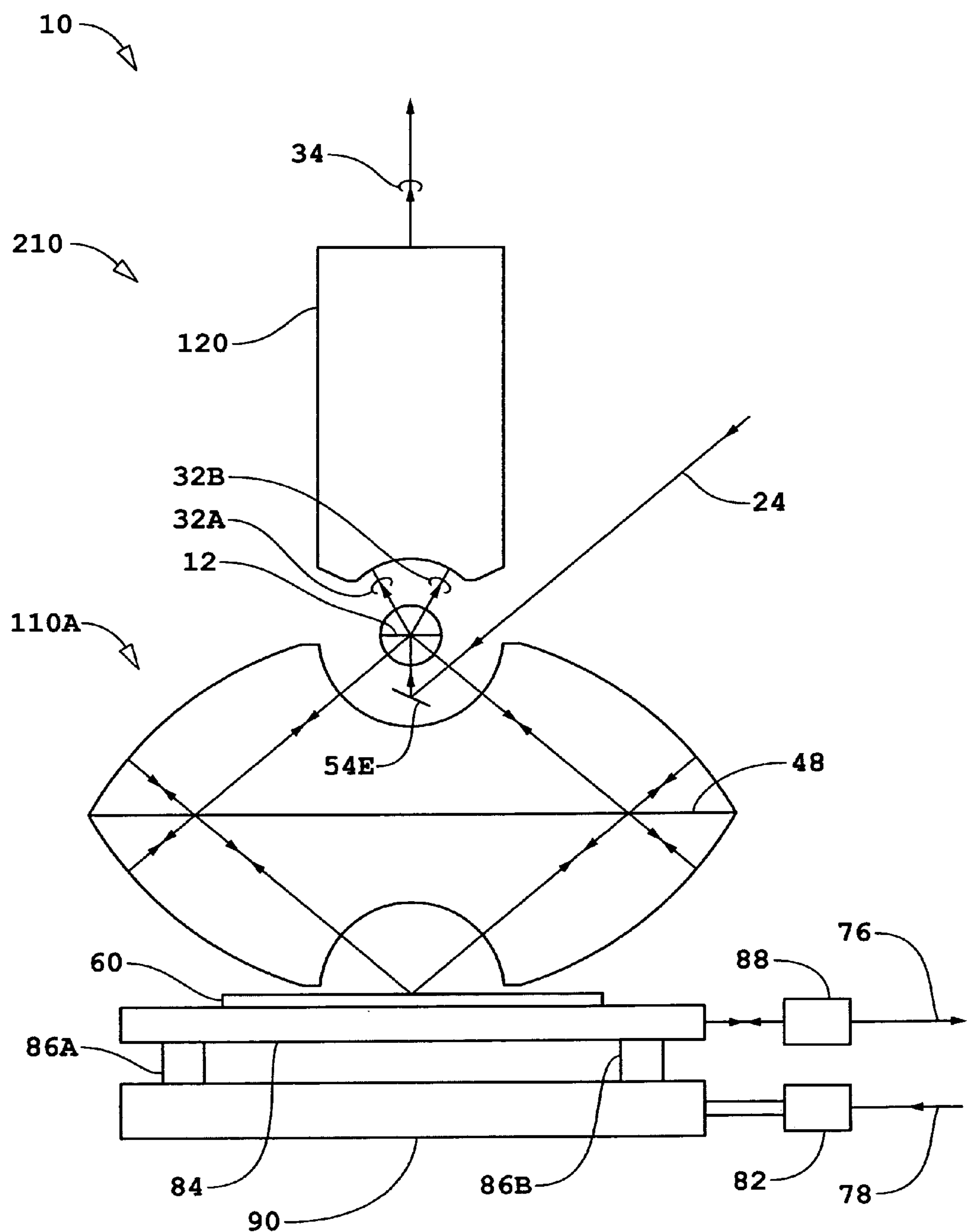
FIG. 1*e* is a schematic diagram of an interferometric confocal microscope system that uses a catadioptric imaging system.

The second embodiment comprises catadioptric imaging system 110A as shown diagrammatically in FIG. 1*e*. Interferometer system 10 of FIG. 1*e* is configured as a confocal interferometric system where interferometer system 10 of FIG. 1*b* is configured as a non-confocal interferometric system. The catadioptric imaging system 110A of the second embodiment is the same as the catadioptric imaging system 110 of the first embodiment except that thin film fluorescent layer 12 is replaced by a pinhole array beam-splitter 12 shown schematically in FIG. 1*f*. The pinhole array beam-splitter 12 is used as the beam-splitter for generating the reference and measurement beams and for the function of combining the reference and measurement beam reflected/scattered by substrate 60.

Pinhole array beam-splitter 12 comprises sub-wavelength apertures 62. The size and spacing of the sub-wavelength apertures are a and b, respectively. The description of the operation of an interferometer comprising a pinhole array beam-splitter is the same as the corresponding description given in cited U.S. Provisional Patent Application No. 60/442,982 (ZI-45) and in cited U.S. patent application filed Jan. 28, 2004 (ZI-45). The remaining description of the second embodiment is the same as corresponding portions of the description given for the first embodiment.

Figure 2A:
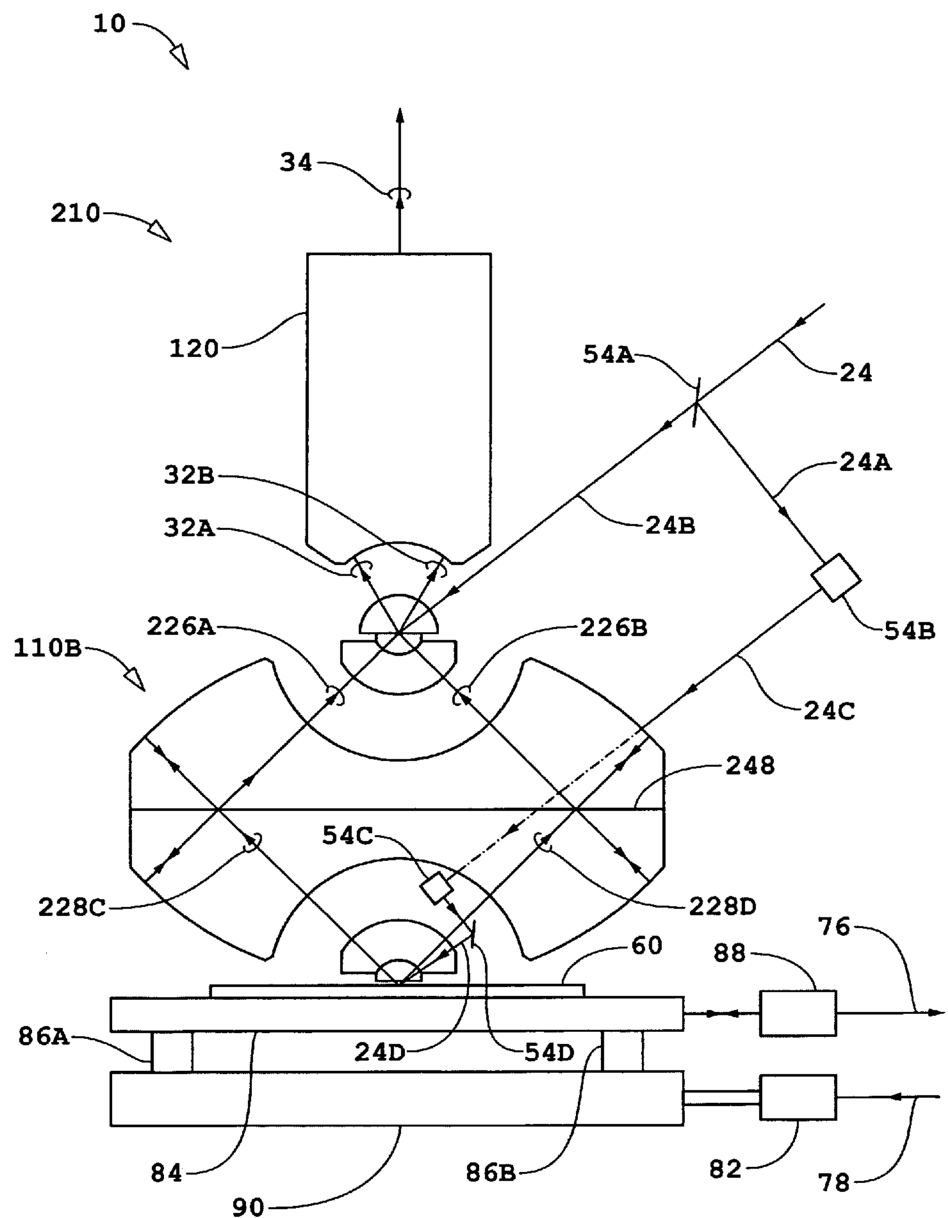
FIG. 2*a* is a schematic diagram of an interferometric non-confocal microscope system that uses a catadioptric imaging system.

The third embodiment comprises catadioptric imaging system 110B as shown diagrammatically in FIG. 2*a*. The description of source 18, beam-conditioner 22, detector 70, an electronic processor and controller 80, and substrate 60 is the same as the corresponding portion of the description given for elements of the first embodiment that have the same element numbers. The catadioptric imaging system 110B of the third embodiment is the same as the catadioptric imaging system 110 of the first embodiment except that there are four compensating convex refractive surfaces instead of a single compensating convex refractive element 50.

Figure 2B:
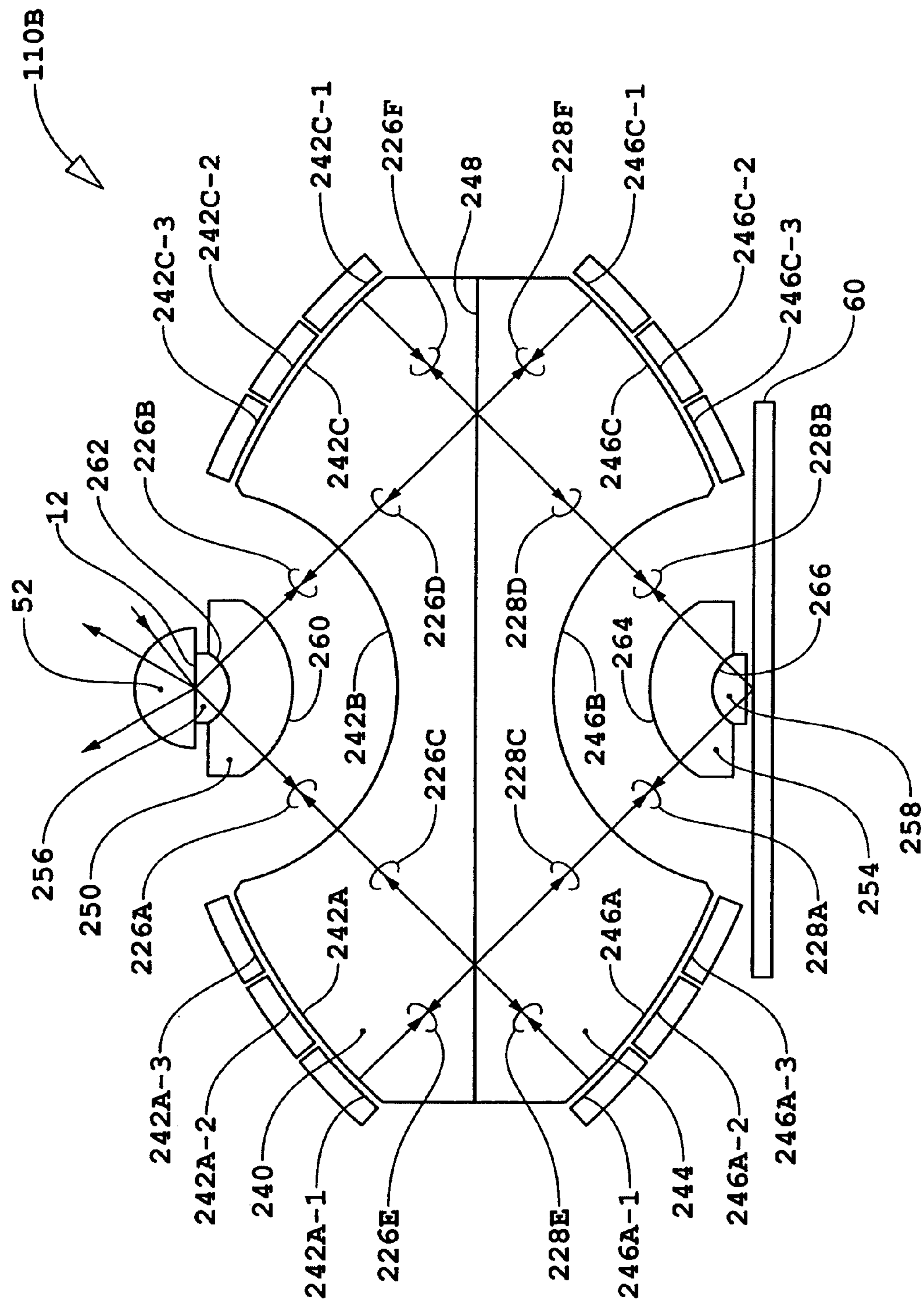
FIG. 2*b* is a diagram of a catadioptric imaging system comprising adaptive catoptric reflecting surfaces.

Catadioptric imaging system 110B of the third embodiment is also shown schematically in FIG. 2*b*. Elements of catadioptric imaging system 110B shown in FIG. 2*b* comprise two different media in order to generate an achromatic anastigmat. Catadioptric imaging system 110B comprises catadioptric elements 240 and 244, beam-splitter 248, concentric lenses 250 and 254, and piano convex lenses 256 and 258. Surfaces 242A and 242C comprise a first single convex spherical surface and surfaces 246A and 246C comprise a second single convex spherical surface with nominally the same radii of curvature and the respective centers of curvature of the first and second single convex spherical surfaces are conjugate points with respect to beam-splitter 248. Surfaces 242B and 246B are concave spherical surfaces with nominally the same radii of curvature. The centers of curvature of surfaces 242B and 246B are the same as the centers of curvature of the second and first single convex spherical surfaces, respectively.

The centers of curvature of the surfaces of concentric lens 250 and plano convex lens 256 are nominally the same as the center of curvature of surfaces 242B and the second single convex spherical surface. The centers of curvature of the surfaces of concentric lens 254 and plano convex lens 258 are nominally the same as the center of curvatures for surface 246B and the first single convex spherical surface. The radii of curvature of surfaces 260 and 264 are nominally the same and the radii of curvature of surfaces 262 and 266 are nominally the same. There may be a small gap between the convex surface and corresponding concave surface of lenses 256 and 250, respectively, and there may be a corresponding small gap between the convex surface and corresponding concave surface of lenses 258 and 254, respectively.

Figure 2C:
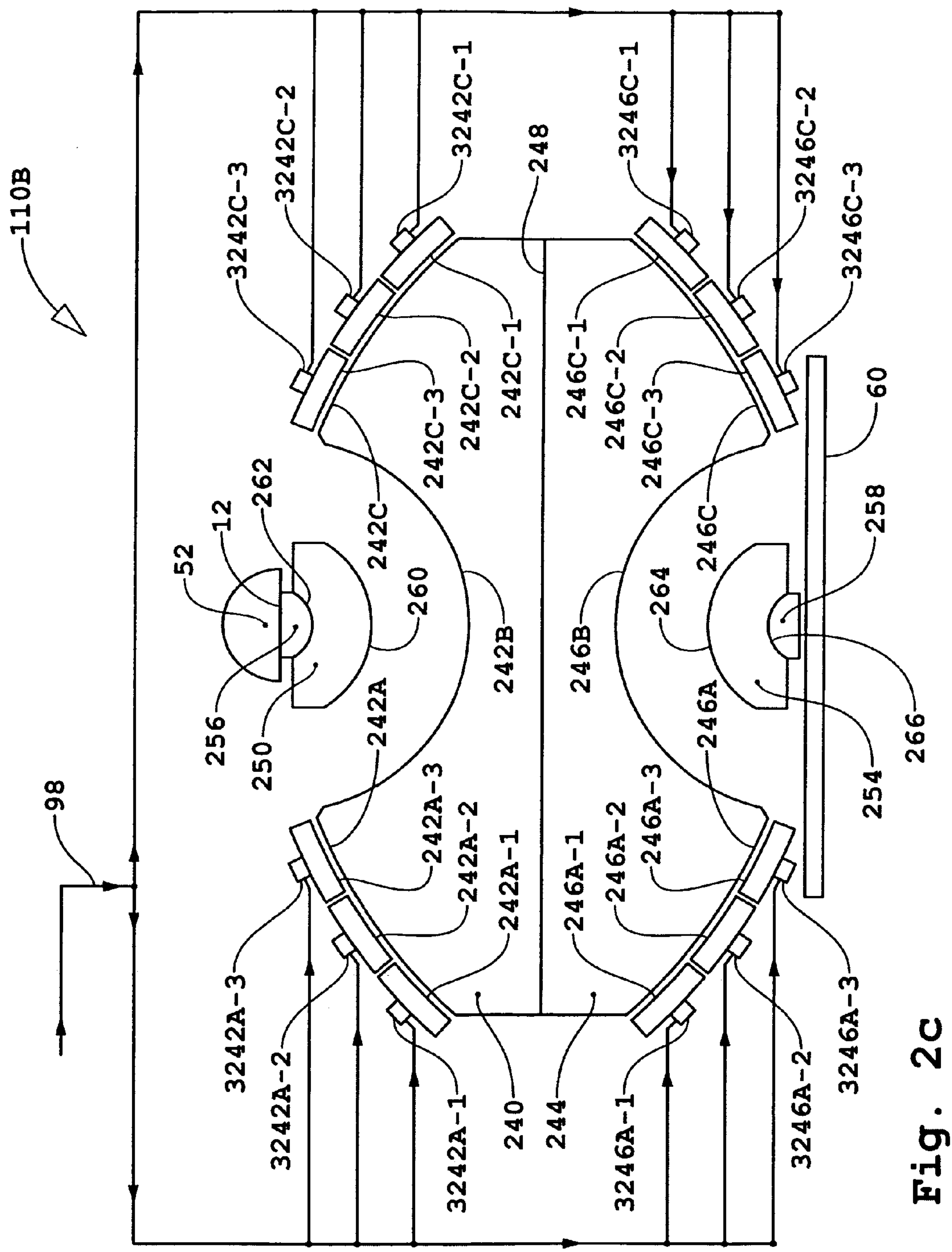
FIG. 2*c* is a diagram of a catadioptric imaging system comprising adaptive catoptric reflecting surfaces attached to displacement transducers.

Associated with the convex refractive surfaces 242A, 242C, 246A, and 246C are adaptive reflective surfaces 242A-1, 242A-2, 242A-3, 242C-1, 242C-2, 242C-3, 246A-1, 246A-2, 246A-3, 246C-1, 246C-2, and 246C-3. The adaptive reflective surfaces 242A-1, 242A-2, 242A-3, 242C-1, 242C-2, 242C-3, 246A-1, 246A-2, 246A-3, 246C-1, 246C-2, and 246C-3 are shown schematically in FIG. 2*b* and the adaptive reflective surfaces with associated transducers 3242A-1, 3242A-2, 3242A-3, 3242C-1, 3242C-2, 3242C-3, 3246A-1, 3246A-2, 3246A-3, 3246C-1, 3246C-2, and 3246C-3, respectively, are shown schematically in FIG. 2*c*.

The description of the different modes of operation of the third embodiment with respect to the adaptive reflective surfaces is the same as corresponding portions of the description given for the operation of the different modes of operation of adaptive reflective surfaces in the first embodiment.

Figure 2D:
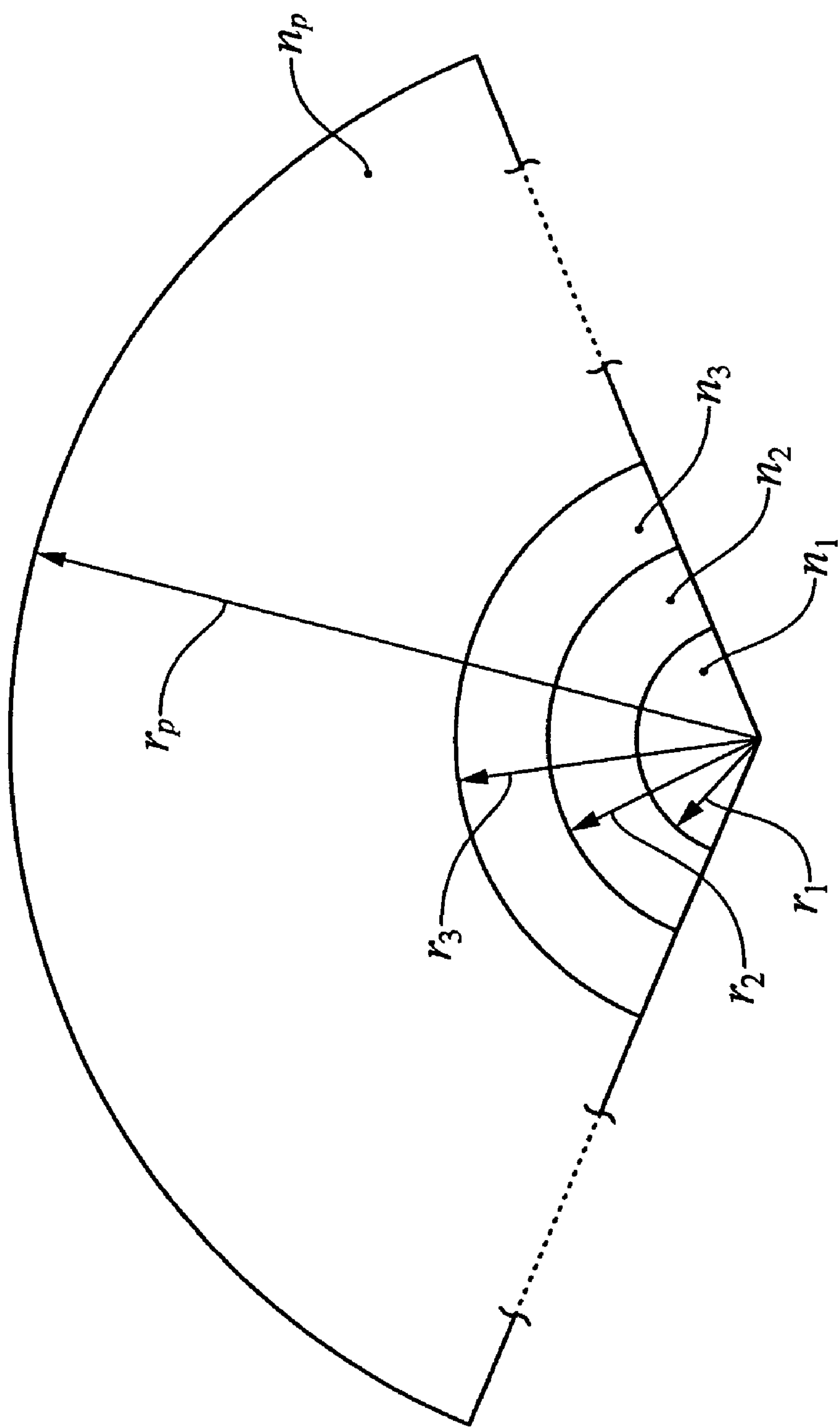
FIG. 2*d* is a diagram showing surfaces and corresponding radii of a catadioptric imaging system.

The sagittal field of catadioptric imaging system 110B is a flat field and the tangential field is also a flat field for a certain object field when the Petzval sum is zero, i.e., $$2\sum_{j=1}^{p-1}\left(\frac{1}{n_j}-\frac{1}{n_{j+1}}\right)\frac{1}{r_j}+\frac{1}{n_p}\frac{2}{r_p}=0 \quad (17)$$

where $r_j$ is the radius of curvature of surface j, $r_p$ is the radius of curvature of the mirror surface, and $n_j$ is the index of refraction of the media located on the beam incidence side of surface j such as shown diagrammatically in FIG. 2*d*. The condition for the generation of an achromatic anastigmat at wavelength $\lambda_c$ is accordingly given by the equation $$\frac{\partial\left[2\sum_{j=1}^{p-1}\left(\frac{1}{n_j}-\frac{1}{n_{j+1}}\right)\frac{1}{r_j}+\frac{1}{n_p}\frac{2}{r_p}\right]}{\partial\lambda}=0. \quad (18)$$

Two considerations in the selection of the radii of curvature of surfaces 242B and 246B and surfaces 262 and 266 are the area of the system pupil function of the imaging system 110B and the size of the object field that can be effectively used with respect to image quality. The first two considerations place competing demands on the selection of the radii of curvature of surfaces 242B and 246B and surfaces 262 and 266. Third and fourth considerations are with respect to the conditions set out in Equations (17) and (18). A fifth consideration in the selection of the media of the lenses of imaging system 110B is the transmission properties of the media for the range of wavelengths to be used in an end use application.

For an example of an achromatic anastigmat design for deep UV operation, the media of elements 240, 244, 256, and 258 is selected as $CaF_2$ and the media of concentric lenses 250 and 254 is selected as a UV grade fused silica. Other parameters of the example achromatic anastigmat design such as the radii of curvature of surfaces are listed in Table 2 for $\lambda_c$=250 nm. With this choice of media, the operation range is down to 170 nm. For the achromatic anastigmat design parameters listed in Table 2, the contribution of geometric ray tracing effects is ≦40 nm for an object field of 1.5 mm in diameter and a numerical aperture NA=0.970 in the object space just outside of the plane surface of plano convex lens 258.

TABLE 2

Achromatic Anastigmat Design for $\lambda_c$ = 250 nm

| Media | j | $n_j$ | $r_j$(mm) |
|---|---|---|---|
| $CaF_2$ | 1 | 1.467297 | 3.600 |
| Fused Silica | 2 | 1.507446 | 9.256 |
| Vacuum | 3 | 1 | 18.000 |
| $CaF_2$ | 4 | 1.467297 | 50.000 |

Figure 2E:
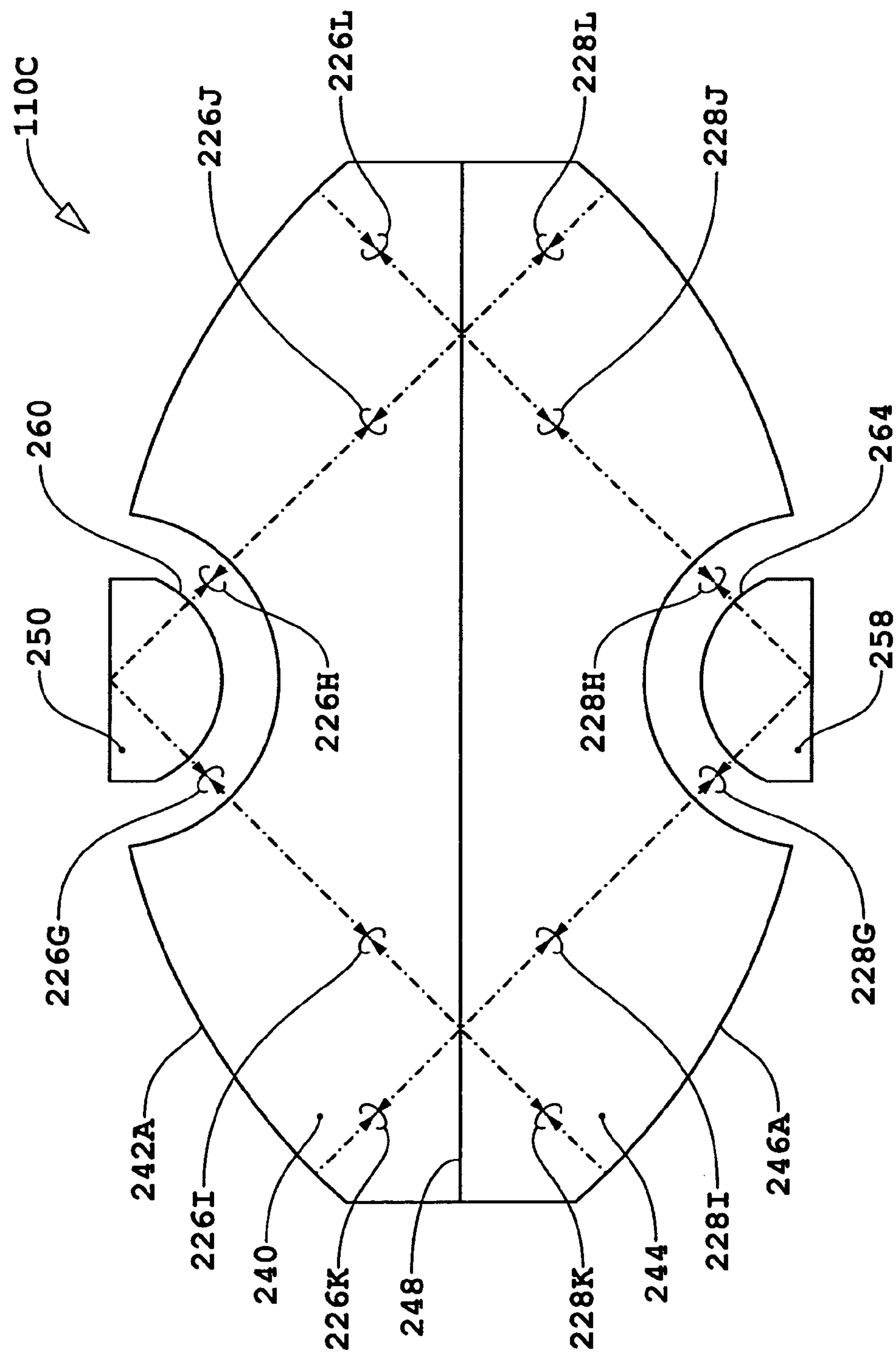
FIG. 2*e* is a diagram of a catadioptric imaging system.

A variant of catadioptric imaging system 110B is shown in FIG. 2*e* wherein catadioptric imaging system 110C is an anastigmat that is not achromatic. The media of elements 240, 244, 250, and 258 may comprise for example $CaF_2$, $BaF_2$, or $SrF_2$ for work down to 140 nm and UV grade fused silica for operation to 180 nm. The respective radii of the curvature for anastigmat design at λ=250 nm using $CaF_2$ are listed in Table 3. For anastigmat design listed in Table 3, the contribution of geometric ray tracing effects is ≦40 nm for an object field of 1.5 mm and a numerical aperture NA=0.970 in the object space just outside of the plane surface of piano convex lens 258.

The respective radii of curvature for anastigmat design at λ=250 nm using fused silica are listed in Table 4. For the anastigmat design listed in Table 4, the contribution of geometric ray tracing effects is ≦40 nm for an object field of 1.5 mm and a numerical aperture NA=0.970 in the object space just outside of the plane surface of piano convex lens 258.

Another form of catadioptric imaging system that may be used for catadioptric and catoptric imaging system 110 is the catadioptric imaging system such as described in commonly owned U.S. Provisional Patent Application No.

TABLE 3

Anastigmat Design for λ = 250 nm

| Media | j | $n_j$ | $r_j$(mm) |
|---|---|---|---|
| $CaF_2$ | 1 | 1.467297 | 7.950 |
| Air | 2 | 1 | 12.000 |
| $CaF_2$ | 3 | 1.467297 | 50.000 |

TABLE 4

Anastigmat Design for λ = 250 nm

| Media | j | $n_j$ | $r_j$(mm) |
|---|---|---|---|
| Fused Silica | 1 | 1.507446 | 7.950 |
| Air | 2 | 1 | 12.000 |
| Fused Silica | 3 | 1.507446 | 50.000 |

60/460,129 (ZI-51) entitled “Apparatus and Method for Measurement of Fields of Forward Scattered/Reflected and Backscattered Beams by an Object in Interferometry” and U.S. patent application Ser. No. 10/816,172 (ZI-51) wherein both of which are by Henry A. Hill and the contents of which are herein incorporated in their entirety by reference.

Figure 2F:
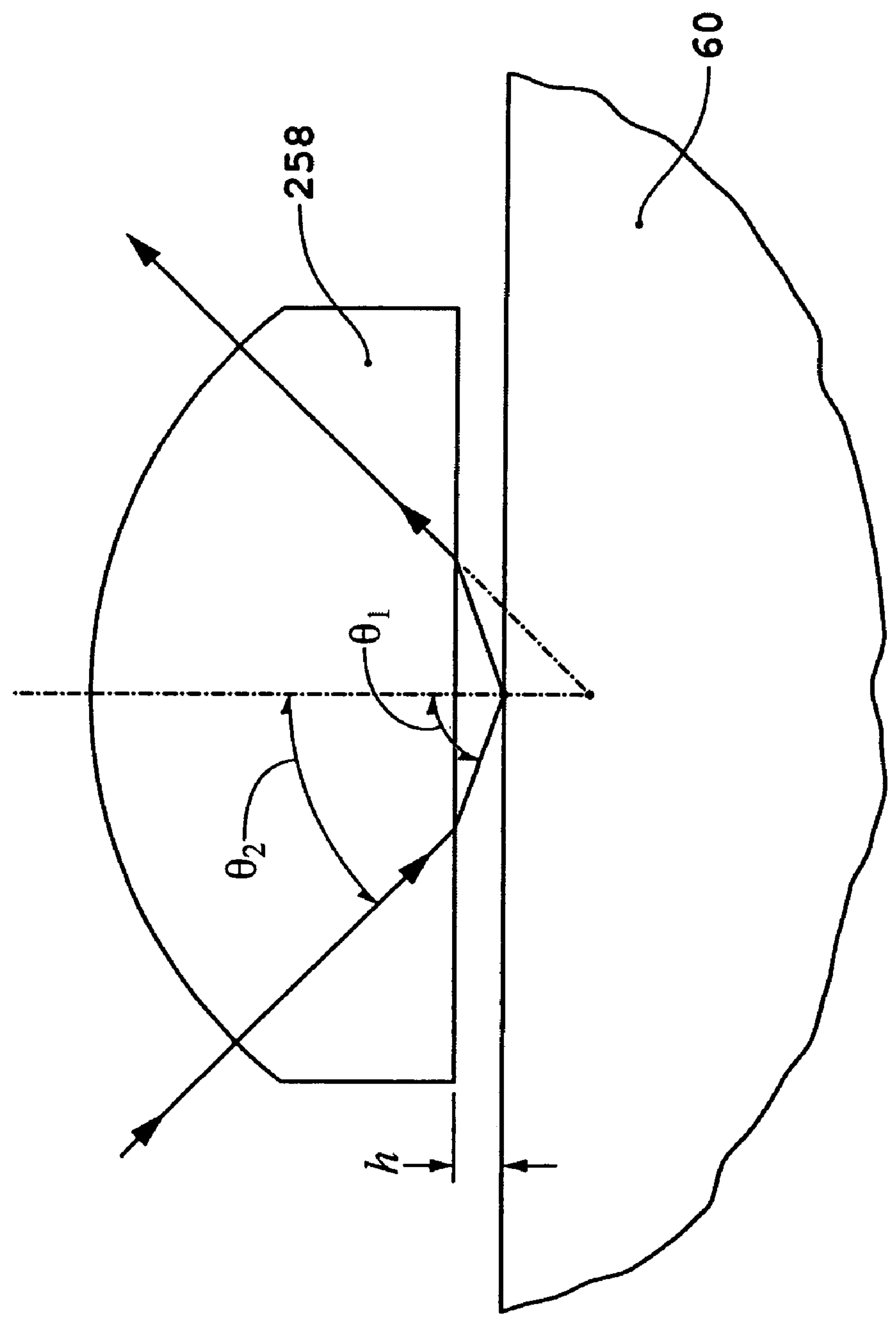
FIG. 2*f* is a schematic diagram of a section of a catadioptric imaging system located near a measurement object and configured to image the surface section of the measurement object.
Figure 2G:
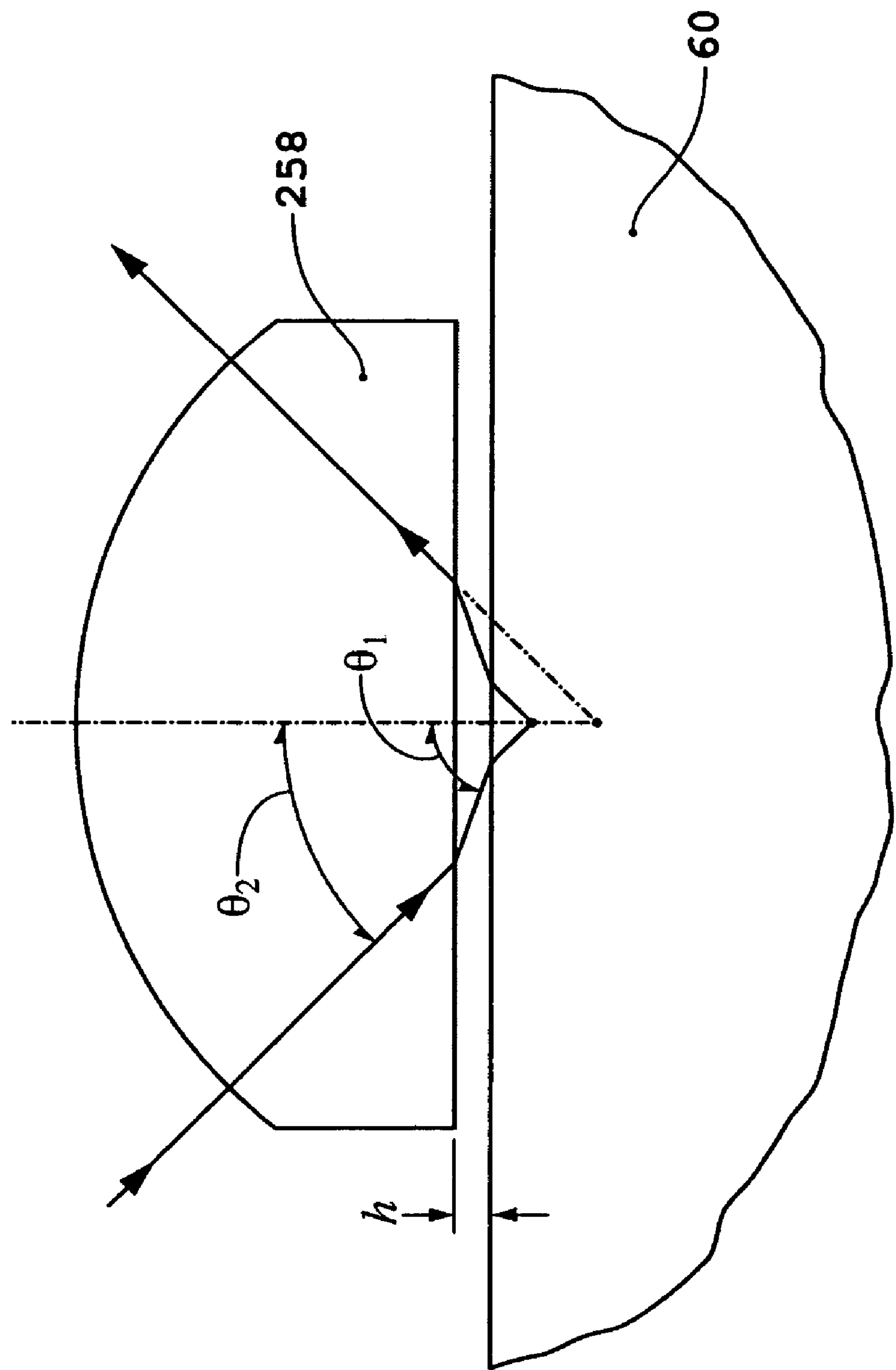
FIG. 2*g* is a schematic diagram of a section of a catadioptric imaging system located near a measurement object and configured to image an interior section of the measurement object.

The location of the object plane of catadioptric imaging system 110C shown diagrammatically in FIG. 2*f* is outside of plano convex lens 258 and on the surface of substrate 60. The separation of the plane surface of plano convex lens 258 and the surface of substrate 60 is h. The object plane of catadioptric imaging system 110B may also be located in the interior of substrate 60 which is shown diagrammatically in FIG. 2*g*. The spherical aberrations introduced by transmission through plane surfaces shown in FIGS. 2*f* and 2*g* are compensated in the third embodiment through the use of the conjugate adaptive reflective surfaces such as described in the first embodiment.

The remaining description of the third embodiment is the same as the corresponding portions of the descriptions of the first and second embodiments and of the catadioptric imaging systems given in cited U.S. Provisional Patent Applications No. 60/485,507 (ZI-52) and No. 60/485,255 (ZI-53) and U.S. Patent Applications filed Jul. 7, 2004 (ZI-52) entitled “Apparatus And Method For High Speed Scan For Detection And Measurement of Properties of Sub-Wavelength Defects And Artifacts In Semiconductor And Mask Metrology” and filed Jul. 7, 2004 (ZI-53) entitled “Apparatus and Method for Ellipsometric Measurements with High Spatial Resolution.”

The mode of operation wherein the object plane is located in the interior of substrate 60 can be used to measure properties of unfilled and filled trenches and vias. The high speed vertical scanning mode makes it possible to measure the properties of the trenches and vias as a function of depth into substrate 60. The interior mode of operation may also be beneficially used in scanning for defects in trenches and vias that are either unfilled or filled with either a transparent dielectric or a conductor.

The location of the object plane of catadioptric imaging system 110C may also be on the plane surface of plano convex lens 258. In this case, the measurement beam can be arranged to probe substrate 60 as an evanescent field when h is of the order of λ/4. The third embodiment can change rapidly from using the evanescent field as a probe beam to using the non-evanescent fields as a probe beam by use of the high speed vertical scan feature.

Figure 1F:
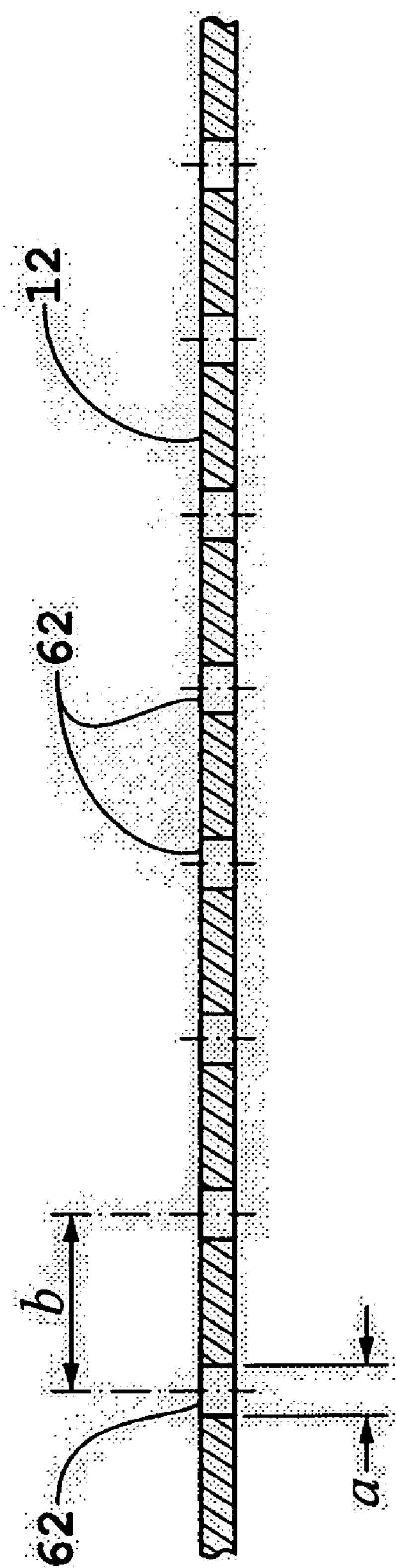
FIG. 1*f* is a schematic diagram of a pinhole array used in a confocal microscope system.

The fourth embodiment comprises catadioptric imaging system 10 of the third embodiment except that thin film fluorescent layer 12 is replaced by a pinhole array beam-splitter 12 the same as in the second embodiment shown schematically in FIG. 1*f*. The pinhole array beam-splitter 12 is used as the beam-splitter for generating the reference and measurement beams and for the function of combining the reference and measurement beam reflected/scattered by substrate 60. The remaining description of the fourth embodiment is the same as corresponding portions of the second and third embodiments.

A fifth embodiment comprises catadioptric imaging system 10 of the first embodiment except without the adaptive reflective surfaces 42A-1, 42A-2, 42A-3, 42C-1, 42C-2, 42C-3, 46A-1, 46A-2, 46C-1, and 46C-2. In their place, the convex spherical surfaces outer surfaces 42A, 42C, 46A, and 46C are made reflecting by coating them with a reflective coating. This fifth embodiment is provided to make the point that the thin fluorescent layer can be used in systems that do not use the adaptive elements but do use a pinhole array beam-combining, beam-splitter in the image plane.

What is claimed is:

1. An imaging system for imaging an object point to an image point, the system comprising:

a beam splitter positioned to receive light rays from the object point and separate each of a plurality of rays into a transmitted portion and a reflected portion, the transmitted portions defining a first set of rays and the reflected portions defining a second set of rays; and an array of independently positionable reflecting elements forming a reflecting surface positioned to receive one of the sets of rays from the beam splitter and focus that set of rays towards the image point via the beam splitter.

2. The imaging system of claim 1, wherein the reflecting surface is positioned to receive the first set of rays and reflect the first set of rays back to the beam splitter, and wherein the beam splitter is positioned to reflect at least a portion of each ray received from the reflecting surface to the image point.

3. The imaging system of claim 2, wherein the reflecting surface is substantially concentric with the object point.

4. The imaging system of claim 1, wherein the reflecting surface is positioned to receive the second set of rays and reflect the second set of rays back to the beam splitter, wherein the beam splitter is positioned to transmit at least a portion of each ray received from the reflecting surface to the image point.

5. The imaging system of claim 4, wherein the reflecting surface is substantially concentric with the image point.

6. The imaging system of claim 1 further comprising a first optic having a convex surface which is concentric with and adjacent to the reflecting surface, said first optic also having a flat surface opposite its convex surface, and wherein the beam splitter is positioned adjacent the flat surface.

7. The imaging system of claim 6 wherein the convex surface of the first optic is a spherical surface.

8. The imaging system of claim 1 further comprising a plurality of position control elements, each of which is connected to a corresponding one of the reflecting elements in the array.

9. The imaging system of claim 8 wherein each of the position control elements of the plurality of position control elements comprises a transducer.

10. The imaging system of claim 9 wherein each transducer of the plurality of transducers controls a radial position of its corresponding reflecting element.

11. The imaging system of claim 9 wherein each transducer of the plurality of transducers controls an orientation of the corresponding reflecting element relative to an optical axis for that reflecting element.

12. The imaging system of claim 9 further comprising a servo control system which controls the plurality of transducers.

13. The imaging system of claim 1 wherein the reflecting surface is nominally a concave reflecting surface.

14. The imaging system of claim 13 wherein the second reflecting surface is nominally a spherical reflecting surface.

15. The imaging system of claim 12 wherein each of the reflecting elements of the array of reflecting elements conforms with a section of a corresponding different annular ring of a set of concentric annular rings.

16. The imaging system of claim 1 wherein the reflecting surface is positioned to receive the first set of rays from the beam splitter and focus that set of rays towards the image point via the beam splitter, said imaging system further comprising a second array of independently positionable reflecting elements forming a second reflecting surface positioned to receive the second set of rays from the beam splitter and focus that set of rays towards the image point via the beam splitter.

17. The imaging system of claim 16 wherein the first-mentioned reflecting surface and the second reflecting surface are located on opposite sides of the beam splitter.

18. The imaging system of claim 16 further comprising a first optic having a convex surface which is concentric with and adjacent to the first-mentioned reflecting surface, said first optic also having a flat surface opposite its convex surface, and wherein the beam splitter is positioned adjacent the flat surface.

19. The imaging system of claim 18 wherein the first optic is located between the beam splitter and the image point.

20. The imaging system of claim 18 further comprising a second optic having a convex surface which is concentric with and adjacent to the second reflecting surface, said second optic also having a flat surface opposite its convex surface, and wherein the beam splitter is positioned adjacent the flat surface of the second optic.

21. The imaging system of claim 20 wherein the second optic is located between the beam splitter and the object point.

22. The imaging system of claim 18 wherein the convex surface of the first optic is a spherical surface.

23. The imaging system of claim 16 wherein the second reflecting surface is a convex reflecting surface.

24. The imaging system of claim 16 wherein each of the reflecting elements of the first-mentioned array of reflecting elements is a section of a corresponding different annular ring of a first set of concentric annular rings.

25. The imaging system of claim 24 wherein each of the reflecting elements of the second array of reflecting elements is a section of a corresponding different annular ring of a second set of concentric annular rings.

26. The imaging system of claim 16 further comprising a beam combiner located at the image point.

27. The imaging system of claim 26 further comprising an optical subsystem that directs a reference beam onto the beam combiner.

28. The imaging system of claim 27 wherein the beam combiner comprises a pinhole array.

29. The imaging system of claim 27 wherein the beam combiner comprises a thin fluorescent layer.

30. The imaging system of claim 29 wherein the thin fluorescent layer comprises lumogen.

31. The imaging system of claim 29 wherein the thin fluorescent layer is sensitive to UV or VUV.

32. The imaging system of claim 29 further comprising a detector and an imaging subsystem that images emissions from the fluorescent layer onto the detector.

33. The imaging system of claim 32, wherein the fluorescent layer is responsive to radiation at a first wavelength and the detector is responsive to light at a second wavelength, wherein the first and second wavelengths are different.

34. The imaging system of claim 32, wherein the fluorescent layer is responsive to radiation in the UV or VUV region and the detector is responsive to light in the visible region.

35. The imaging system of claim 20, wherein the first optic is made of a material from the group consisting of $CaF_2$, fused silica, UV grade fused silica, fluorine-doped fused silica (F—$SiO_2$), and commercially available glass.

36. The imaging system of claim 20, wherein the second optic is made of a material from the group consisting of $CaF_2$, fused silica, UV grade fused silica, fluorine-doped fused silica (F—$SiO_2$), and commercially available glass.

37. An interferometric system comprising:

an interferometer that directs a measurement beam at an object point to produce a return measurement beam, focuses the return measurement beam to an image point in an image plane, and mixes the return measurement beam with a reference beam at the image point to form a mixed beam;

a thin fluorescent layer located at the image plane which is responsive to the mixed beam and produces an optical beam therefrom;

a detector that is responsive to the optical beam from the fluorescent layer; and an imaging system that directs the optical beam from the fluorescent layer onto the detector.

38. The interferometric system of claim 37, wherein the fluorescent layer comprises lumogen.

39. The interferometric system of claim 37, wherein the fluorescent layer is sensitive to UV or VUV.

40. The interferometric system of claim 37, wherein the fluorescent layer is responsive to radiation at a first wavelength and the detector is responsive to light at a second wavelength, wherein the first and second wavelengths are different.

41. The interferometric system of claim 37, wherein the fluorescent layer is responsive to radiation in the UV or VUV region and the detector is responsive to light in the visible region.

42. The interferometric system of claim 37, wherein the imaging system is a low power microscope.

43. The interferometric system of claim 37, wherein the interferometer comprises a catadioptric imaging system.

44. The interferometric system of claim 37, wherein the interferometer comprises:

a beam splitter positioned to receive the return measurement beam from the object point and separate each of a plurality of rays into a transmitted portion and a reflected portion, the transmitted portions defining a first set of rays and the reflected portions defining a second set of rays; and a reflecting surface positioned to receive one of the sets of rays from the beam splitter and focus that set of rays towards the image point via the beam splitter.

45. The interferometric system of claim 44, wherein the interferometer comprises an array of independently positionable reflecting elements forming the reflecting surface.

46. The interferometric system of claim 45, wherein the reflecting surface is positioned to receive the first set of rays and reflect the first set of rays back to the beam splitter, and wherein the beam splitter is positioned to reflect at least a portion of each ray received from the reflecting surface to the image point.

47. The interferometric system of claim 46, wherein the reflecting surface is substantially concentric with the object point.

48. The interferometric system of claim 45, wherein the reflecting surface is positioned to receive the second set of rays and reflect the second set of rays back to the beam splitter, wherein the beam splitter is positioned to transmit at least a portion of each ray received from the reflecting surface to the image point.

49. The interferometric system of claim 48, wherein the reflecting surface is substantially concentric with the image point.

50. The interferometric system of claim 45 further comprising a first optic having a convex surface which is concentric with and adjacent to the reflecting surface, said first optic also having a flat surface opposite its convex surface, and wherein the beam splitter is positioned adjacent the flat surface.

51. The interferometric system of claim 50 wherein the convex surface of the first optic is a spherical surface.

52. The interferometric system of claim 45 further comprising a plurality of position control elements, each of which is connected to a corresponding one of the reflecting elements in the array.

53. The interferometric system of claim 52 wherein each of the position control elements of the plurality of position control elements comprises a transducer.

54. The interferometric system of claim 53 wherein each transducer of the plurality of transducers controls a radial position of its corresponding reflecting element.

55. The interferometric system of claim 53 wherein each transducer of the plurality of transducers controls an orientation of the corresponding reflecting element relative to an optical axis for that reflecting element.

56. The interferometric system of claim 53 further comprising a servo control system which controls the plurality of transducers.

57. The interferometric system of claim 45 wherein the reflecting surface is nominally a concave reflecting surface.

58. The interferometric system of claim 57 wherein the second reflecting surface is nominally a spherical reflecting surface.

59. The interferometric system of claim 56 wherein each of the reflecting elements of the array of reflecting elements conforms with a section of a corresponding different annular ring of a set of concentric annular rings.

60. The interferometric system of claim 45 wherein the reflecting surface is positioned to receive the first set of rays from the beam splitter and focus that set of rays towards the image point via the beam splitter, said imaging system further comprising a second array of independently positionable reflecting elements forming a second reflecting surface positioned to receive the second set of rays from the beam splitter and focus that set of rays towards the image point via the beam splitter.

61. The interferometric system of claim 60 wherein the first-mentioned reflecting surface and the second reflecting surface are located on opposite sides of the beam splitter.

62. The interferometric system of claim 60 further comprising a first optic having a convex surface which is concentric with and adjacent to the first-mentioned reflecting surface, said first optic also having a flat surface opposite its convex surface, and wherein the beam splitter is positioned adjacent the flat surface.

63. The interferometric system of claim 62 wherein the first optic is located between the beam splitter and the image point.

64. The interferometric system of claim 62 further comprising a second optic having a convex surface which is concentric with and adjacent to the second reflecting surface, said second optic also having a flat surface opposite its convex surface, and wherein the beam splitter is positioned adjacent the flat surface of the second optic.

65. The interferometric system of claim 64 wherein the second optic is located between the beam splitter and the object point.

66. The interferometric system of claim 62 wherein the convex surface of the first optic is a spherical surface.

67. The interferometric system of claim 60 wherein the second reflecting surface is a convex reflecting surface.

68. The interferometric system of claim 60 wherein each of the reflecting elements of the first-mentioned array of reflecting elements is a section of a corresponding different annular ring of a first set of concentric annular rings.

69. The interferometric system of claim 68 wherein each of the reflecting elements of the second array of reflecting elements is a section of a corresponding different annular ring of a second set of concentric annular rings.

70. A method of performing measurements of an object using an interferometer, said method comprising:

generating a measurement beam including a first beam at a first frequency and a second beam at a second frequency that is different from the first frequency, said first and second beams being coextensive and sharing the same temporal window;

focusing the measurement beam towards an object point on a substrate to produce a return measurement beam, said return measurement beam having N portions each of which represents a different angular segment for the return measurement beam, wherein N is an integer greater than 1;

for each portion of the N portions of the return measurement beam, splitting that portion into a first part and a second part;

for each portion of the N portions of the return measurement beam, introducing a corresponding sequence of relative phase shifts between the first and second parts of that portion of the return measurement beam;

for each portion of the N portions of the return measurement beam, recombining the first and second parts after they have been phased shifted relative to each other to generate a corresponding portion of a recombined beam;

interfering the recombined beam with a reference beam to produce a interference beam; and by measuring the interference beam jointly measuring two orthogonal components of conjugated quadratures of N different portions of reflected, scattered, or transmitted beams from the object point.

* * * * *